: US 9,891,937 B2

(12) United States Patent
Park et al.

(10) Patent No.: US 9,891,937 B2
(45) Date of Patent: Feb. 13, 2018

(54) METHOD FOR MANAGING VIRTUAL MACHINE AND DEVICE THEREFOR

(71) Applicant: LG ELECTRONICS INC., Seoul (KR)

(72) Inventors: Seungkyu Park, Anyang-si (KR); Seongyun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 812 days.

(21) Appl. No.: 14/369,951

(22) PCT Filed: Jan. 30, 2013

(86) PCT No.: PCT/KR2013/000763
§ 371 (c)(1),
(2) Date: Jun. 30, 2014

(87) PCT Pub. No.: WO2013/115565
PCT Pub. Date: Aug. 8, 2013

(65) Prior Publication Data
US 2014/0359619 A1 Dec. 4, 2014

Related U.S. Application Data

(60) Provisional application No. 61/592,555, filed on Jan. 30, 2012, provisional application No. 61/620,444, (Continued)

(51) Int. Cl.
*G06F 9/455* (2006.01)

(52) U.S. Cl.
CPC ...... *G06F 9/45533* (2013.01); *G06F 9/45558* (2013.01); *G06F 2009/45562* (2013.01);
(Continued)

(58) Field of Classification Search
CPC ............. G06F 9/45533; G06F 9/45558; G06F 9/45562; G06F 9/45575; G06F 9/45595
(Continued)

(56) References Cited

U.S. PATENT DOCUMENTS

2006/0026228 A1* 2/2006 Kim ...................... H04L 67/325
709/202
2007/0136327 A1* 6/2007 Kim ........................ H04L 67/04
(Continued)

FOREIGN PATENT DOCUMENTS

JP 2007-328785 A 12/2007
JP 2009-532944 A 9/2009
(Continued)

OTHER PUBLICATIONS

Fraser et al., "Safe Hardware Access with the Xen Virtual Machine Monitor," Internet Citation, XP-002370809, Oct. 2004, 10 pages.

*Primary Examiner* — Jason D Mitchell
(74) *Attorney, Agent, or Firm* — Birch, Stewart, Kolasch & Birch, LLP

(57) ABSTRACT

The present invention relates to a virtual machine, and more particularly, to a method for performing device management for a virtual machine in a terminal comprising a plurality of virtual machines, and a device therefor, the method comprising the steps of: generating a specific virtual machine; constituting at least one management object, which is required for providing device management for the specific virtual machine, in a virtualization management object; receiving a device management command from a server; checking whether the device management command is for the specific virtual machine; and processing the device management command if the device management command is for the specific virtual machine, wherein the virtualization management object includes a first node for setting up information related to the specific virtual machine and (Continued)

includes, below the first node, a second node for setting up information required for device management for the specific virtual machine, and the at least one management object is formed below the second node.

6 Claims, 27 Drawing Sheets

Related U.S. Application Data filed on Apr. 5, 2012, provisional application No. 61/696,310, filed on Sep. 4, 2012, provisional application No. 61/700,349, filed on Sep. 13, 2012, provisional application No. 61/716,625, filed on Oct. 22, 2012, provisional application No. 61/738,390, filed on Dec. 17, 2012.

(52) U.S. Cl.
CPC .............. *G06F 2009/45575* (2013.01); *G06F 2009/45579* (2013.01)

(58) Field of Classification Search
USPC .................................................. 718/1
See application file for complete search history.

(56) References Cited

U.S. PATENT DOCUMENTS

| | | | |
|---|---|---|---|
| 2007/0174445 A1* | 7/2007 | Kim | G06F 8/61 709/223 |
| 2007/0207800 A1* | 9/2007 | Daley | H04L 12/2602 455/425 |
| 2007/0239987 A1 | 10/2007 | Hoole et al. | |
| 2007/0266389 A1 | 11/2007 | Ganguly et al. | |
| 2008/0010496 A1 | 1/2008 | Das et al. | |
| 2008/0046583 A1* | 2/2008 | Rao | H04L 12/18 709/230 |
| 2008/0059556 A1* | 3/2008 | Greenspan | G06F 9/5077 709/201 |
| 2008/0222633 A1* | 9/2008 | Kami | G06F 9/45558 718/1 |
| 2008/0244579 A1* | 10/2008 | Muller | G06F 9/5027 718/100 |
| 2008/0288630 A1* | 11/2008 | Merat | G06F 11/1451 709/224 |
| 2008/0301640 A1* | 12/2008 | Keum | G06F 8/60 717/120 |
| 2009/0265708 A1 | 10/2009 | Nakajima | |
| 2009/0271781 A1* | 10/2009 | Cui | G06F 8/61 717/173 |
| 2009/0327471 A1* | 12/2009 | Astete | G06F 9/45533 709/223 |
| 2010/0115512 A1* | 5/2010 | Sakai | G06F 9/45533 718/1 |
| 2010/0125844 A1* | 5/2010 | Mousseau | G06F 9/50 718/1 |
| 2010/0250868 A1 | 9/2010 | Oshins | |
| 2010/0299387 A1* | 11/2010 | Runcie | G06F 9/455 709/203 |
| 2011/0106929 A1* | 5/2011 | Lee | G06F 9/45533 709/223 |
| 2012/0023227 A1* | 1/2012 | Song | H04L 12/24 709/224 |
| 2012/0117212 A1* | 5/2012 | Fries | G06F 8/61 709/223 |
| 2012/0158920 A1* | 6/2012 | Yang | G06F 8/61 709/220 |

FOREIGN PATENT DOCUMENTS

| | | |
|---|---|---|
| JP | 2009-259108 A | 11/2009 |
| KR | 10-2009-0009866 A | 1/2009 |
| KR | 10-2011-0064539 A | 6/2011 |
| KR | 10-2012-0000066 A | 1/2012 |

\* cited by examiner

FIG. 21

```
<Alert>
  <CmdID>2</CmdID>
  <Data>1226</Data>    <!-- Generic Alert -->
  <Item>
     <Source><LocURI>./VirMO/VM1/DMTree/FUMO</LocURI></Source>
     <Meta>
        <Type xmlns='syncml:metinf'>
                   org.openmobilealliance.dm.firmwareupdate.devicerequest
        </Type>
        <Format xmlns='syncml:metinf'>xml</Format>
     </Meta>
     <Data>
        <!-- Data Goes Here -->
     </Data>
  </Item>
</Alert>
```

FIG. 22

```
<Alert>
  <CmdID>2</CmdID>
  <Data>1226</Data>    <!-- Generic Alert -->
  <Item>
    <Source><LocURI>./VirMO/VM1/DMTree/FUMO</LocURI></Source>
    <Meta>
      <Type xmlns='syncml:metinf'>
              org.openmobilealliance.dm.firmwareupdate.devicerequest-vm
      </Type>
      <Format xmlns='syncml:metinf'>xml</Format>
    </Meta>
    <Data>
      <!-- Data Goes Here -->
    </Data>
  </Item>
</Alert>
```

FIG. 23

```
<Alert>
    <CmdID>2</CmdID>
    <Data>1100</Data>
    <Item><Data>MINDT=10</Data></Item>
    <Item>
      <Data>Management in progress</Data>
    </Item>
</Alert>
```

FIG. 26

```
<Alert>
  <CmdID>2</CmdID>
  <Data>1101</Data>
  <Item></Item> <!-- no optional parameters -->
  <Item>
     <Data>Do you want to add the CNN access point?</Data>
  </Item>
</Alert>
```

(a)

```
<Status>
   <CmdID>2</CmdID>
   <MsgRef>1</MsgRef>
   <CmdRef>2</CmdRef>
   <Cmd>Alert</Cmd>
   <Data>304</Data> <!-- Answer was "no" -->
</Status>
```

(b)

METHOD FOR MANAGING VIRTUAL MACHINE AND DEVICE THEREFOR

CROSS REFERENCE TO RELATED APPLICATIONS

This application is the National Phase of PCT International Application No. PCT/KR2013/000763, filed on Jan. 30, 2013, which claims priority under 35 U.S.C. 119(e) to U.S. Provisional Application Nos. 61/592,555 filed on Jan. 30, 2012, 61/620,444 filed on Apr. 5, 2012, 61/696,310 filed on Sep. 4, 2012, 61/700,349 filed on Sep. 13, 2012, 61/716,625 filed on Oct. 22, 2012, 61/738,390 filed on Dec. 17, 2012, all of which are hereby expressly incorporated by reference into the present application.

BACKGROUND OF THE INVENTION

Field of Invention

The present invention relates to a virtual machine and, more particularly, to a method for managing a virtual machine of a terminal at a server and a device therefor.

Discussion of the Related Art

In conventional management models, one operating system (OS) is installed in a single computing environment to mainly provide services such as web services via the OS. For example, if a database service is provided, an OS and a database program are installed in a new computing environment to provide the service. In general, conventional management models do not provide different services on a single platform. Accordingly, in order to provide a new service, different platforms are required and thus installation and management costs may be increased.

In order to overcome such problems, virtualization technology is used. Virtualization provides virtual versions of hardware platforms, OSs, devices, networks, etc. For example, OS virtualization provides hardware abstraction platform instead of direct communication between an OS and a physical device. A user may install an OS having a separate computing environment on hardware abstraction platform. It is possible to provide a plurality of independent computing environments on a single platform through virtualization and to manage the independent computing environments via a control program on the single platform. Thus, virtualization is advantageous. In addition, since a plurality of services may be managed on one hardware platform through virtualization, the number of physical entities may be reduced and costs therefor may be reduced.

As virtualization technology for providing hardware abstraction platform, there is a virtual machine and a product "VMware" is widely known in a personal computer (PC) environment. The virtual machine provides an independent execution environment. The independent execution environment means that applications operating in one virtual machine do not influence on applications operating in another virtual machine.

Although VMware is widely used as virtualization technology in a personal computer (PC) environment, it is difficult to apply VMware to a terminal as technology of managing a VM at a server. VMware was developed as technology for hardware abstraction platform in a device, but does not include technology of managing a virtual machine (VM) at a remote server. Accordingly, there is a need for a new approach to basic management technology of, at a remote server, creating and deleting a virtual machine in and from a terminal.

In addition, VMware requires a remote control method for, at a remote server, locking, unlocking or updating a virtual machine created in a terminal.

SUMMARY OF THE INVENTION

An object of the present invention devised to solve the problem lies in a method for efficiently managing a virtual machine in a terminal. Another object of the present invention devised to solve the problem lies in a method for efficiently managing each virtual machine of a terminal at a server when the terminal has a plurality of virtual machines.

Another object of the present invention devised to solve the problem lies in a method for, at a server, efficiently creating and deleting a new virtual machine in and from a terminal.

Another object of the present invention devised to solve the problem lies in a method for, at a server, delivering a virtual machine image to a terminal and a method for, at a server, efficiently creating a virtual machine using the delivered virtual machine image.

Another object of the present invention devised to solve the problem lies in a method for duplicating a virtual machine at a server.

Another object of the present invention devised to solve the problem lies in a method for locking and unlocking a virtual machine at a server. Another object of the present invention devised to solve the problem lies in an efficient user unlocking method.

Another object of the present invention devised to solve the problem lies in a method for performing device management for a virtual machine using open mobile alliance (OMA) device management (DM) at a server.

The technical problems solved by the present invention are not limited to the above technical problems and other technical problems which are not described herein will become apparent to those skilled in the art from the following description.

The object of the present invention can be achieved by providing a method for performing device management for a virtual machine at a terminal including a plurality of virtual machines, the method including creating a specific virtual machine, configuring at least one management object necessary to provide device management for the specific virtual machine in a virtualization management object, receiving a device management command from a server, checking whether the device management command is a device management command for the specific virtual machine, processing the device management command if the device management command is the device management command for the specific virtual machine, wherein the virtualization management object includes a first node for configuring information related to the specific virtual machine and includes a second node for configuring information necessary for device management for the specific virtual machine under the first node, and the at least one management object is configured under the second node.

Preferably, the virtualization management object may further include a node for configuring identification information of the specific virtual machine under the first node and the checking may include determining that the device management command is for a virtual machine identified by the identification information if the device management command is targeted at a node located under the second node.

Preferably, the at least one management object may have a root node configured under the second node and the root node includes a management object identification information, and the at least one management object may be identified by the management object identification information.

Preferably, the virtualization management object may be included in a device management tree of the terminal.

Preferably, the identification information of the specific virtual machine may be provided by the terminal and uniquely indicate the specific virtual machine within the virtualization management object.

Preferably, the first node may be a virtualization management object (VirMO)/<x> node, the second node may be a VirMO/<x>/device management (DM) tree (DMTree) node, and <x> may be information indicating the specific virtual machine.

Preferably, the at least one management object may include a firmware update management object (FUMO), a software component management object (SCOMO) and/or a lock and wipe management object (LAWMO).

Preferably, the virtualization management object may include a third node for configuring information on user interaction and a fourth node for receiving a user interaction command under the first node, the receiving the device management command may include receiving an execution command via the fourth node, and the processing the device management command may include executing command information of the user interaction configured in the third node.

Preferably, the third node may be a VirMO/<x>/UI/UICommands node, the fourth node may be a VirMO/<x>/Operations/ShowUI node, and <x> may be information indicating the specific virtual machine.

In another aspect of the present invention, provided herein is a terminal including a plurality of machines and configured to perform device management for a virtual machine, the terminal including a processor and a transceiver module, wherein the processor is configured to create a specific virtual machine, to configure at least one management object necessary to provide device management for the specific virtual machine in a virtualization management object, to receive a device management command from a server, to check whether the device management command is a device management command for the specific virtual machine, to process the device management command if the device management command is the device management command for the specific virtual machine, wherein the virtualization management object includes a first node for configuring information related to the specific virtual machine and includes a second node for configuring information necessary for device management for the specific virtual machine under the first node, and the at least one management object is configured under the second node.

Preferably, the virtualization management object may further include a node for configuring identification information of the specific virtual machine under the first node and the checking may include determining that the device management command is for a virtual machine identified by the identification information if the device management command is targeted at a node located under the second node.

Preferably, the at least one management object may have a root node configured under the second node and the root node includes a management object identification information, and the at least one management object may be identified by the management object identification information.

Preferably, the virtualization management object may be included in a device management tree of the terminal.

Preferably, the identification information of the specific virtual machine may be provided by the terminal and uniquely indicate the specific virtual machine within the virtualization management object.

Preferably, the first node may be a VirMO/<x> node, the second node may be a VirMO/<x>/DMTree node, and <x> may be information indicating the specific virtual machine.

Preferably, the at least one management object may include a firmware update management object (FUMO), a software component management object (SCOMO) and/or a lock and wipe management object (LAWMO).

Preferably, the virtualization management object may include a third node for configuring information on user interaction and a fourth node for receiving a user interaction command under the first node, the receiving the device management command may include receiving an execution command via the fourth node, and the processing the device management command may include executing command information of the user interaction configured in the third node.

Preferably, the third node may be a VirMO/<x>/UI/UICommands node, the fourth node may be a VirMO/<x>/Operations/ShowUI node, and <x> may be information indicating the specific virtual machine.

In another aspect of the present invention, provided herein is a method for creating a virtual machine at a terminal having a virtualization management object and a virtual machine image management object, the virtual machine image management object including a plurality of nodes in which virtual machine image identification information of a plurality of virtual machines are configured, the method including receiving an execution command from a server, and creating a specific virtual machine according to a virtual machine creation parameter configured in a second node of the virtualization management object if the execution command is transmitted to a first node related to a virtual machine creation operation of the virtualization management object, wherein the virtual machine creation parameter configured in the second node includes first information for specifying a virtual machine image used to create the specific virtual machine and the first information is one of the virtual machine image identification information configured in the plurality of nodes.

Preferably, the virtual machine creation parameter may further include second information indicating a state of the created specific virtual machine, if the second information is a first value, the created specific virtual machine may be in an execution state, and, if the second information is a second value, the created specific virtual machine may be a power off state.

Preferably, the virtual machine image management object may be included in a device management tree of a terminal.

Preferably, the virtual machine image identification information may be provided by a terminal and may uniquely indicate a specific virtual machine image within the virtual machine image management object.

The method may further include transmitting a response to the server using a synchronous reporting mechanism or an asynchronous reporting mechanism.

Preferably, the method may further include receiving an execution command from the server, and, if the execution command is transmitted to a first node related to a virtual machine deletion operation of the virtualization management object, the created specific virtual machine may be deleted.

In another aspect of the present invention, provided herein is a terminal having a virtualization management object and a virtual machine image management object and configured to create a virtual machine, the virtual machine image management object including a plurality of nodes in which virtual machine image identification information of a plurality of virtual machines are configured, the terminal including a processor and a transceiver module, wherein the processor is configured to receive an execution command from a server and to create a specific virtual machine according to a virtual machine creation parameter configured in a second node of the virtualization management object if the execution command is transmitted to a first node related to a virtual machine creation operation of the virtualization management object, wherein the virtual machine creation parameter configured in the second node includes first information for specifying a virtual machine image used to create the specific virtual machine and the first information is one of the virtual machine image identification information configured in the plurality of nodes.

Preferably, the virtual machine creation parameter may further include second information indicating a state of the created specific virtual machine, if the second information is a first value, the created specific virtual machine may be in an execution state, and, if the second information is a second value, the created specific virtual machine may be a power off state.

Preferably, the virtual machine image management object may be included in a device management tree of a terminal.

Preferably, the virtual machine image identification information may be provided by a terminal and may uniquely indicate a specific virtual machine image within the virtual machine image management object.

The method may further include transmitting a response to the server using a synchronous reporting mechanism or an asynchronous reporting mechanism.

Preferably, the method may further include receiving an execution command from the server, and, if the execution command is transmitted to a first node related to a virtual machine deletion operation of the virtualization management object, the created specific virtual machine may be deleted.

According to the present invention, a server can efficiently manage a virtual machine of a terminal. According to the present invention, a server can efficiently manage each virtual machine of a terminal when the terminal has a plurality of virtual machines.

According to the present invention, a server can efficiently create and delete a new virtual machine in and from a terminal.

According to the present invention, a server can efficiently deliver a virtual machine image to a terminal and efficiently create a virtual machine using the delivered virtual machine image. More specifically, the server can deliver a VM image necessary to create a virtual machine to the terminal and control VM creation according to a VM image type. Thus, the server can deliver the VM image to the terminal once and create a plurality of VMs in the terminal using the same VM image, and one VM image may be used to create only one VM.

According to the present invention, a server can duplicate a virtual machine in a terminal.

According to the present invention, a server can lock and unlock a virtual machine. According to the present invention, efficient user unlocking is possible. More specifically, the server can remotely lock the virtual machine for storing secret data and securely protect data in the virtual machine. In addition, the server can unlock the locked virtual machine. The virtual machine may be locked regardless of the internal state of the virtual machine, thereby efficiently managing the virtual machine. In addition, the server can enable a user to directly, safely and conveniently unlock the locked virtual machine.

According to the present invention, a server can perform device management for a virtual machine using open mobile alliance (OMA) device management (DM). More specifically, the server can provide a device management function without creating a new DM client with respect to the created virtual machine. For device management for the virtual machine, the server creates only at least a management object (MO) necessary for the virtual machine.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a better understanding of the invention, illustrate embodiments of the invention and together with the description serve to explain the principle of the invention.

FIG. 21 is a diagram showing a generic alert including source information.

FIG. 22 is a diagram showing an example of attaching a postfix "-vm" to Type in an example of the generic alert of FIG. 20.

FIG. 23 is a diagram showing a UI alert.

FIG. 26 is a diagram showing a UI alert and user input information.

DETAILED DESCRPTION OF THE INVENTION

Figure 1:
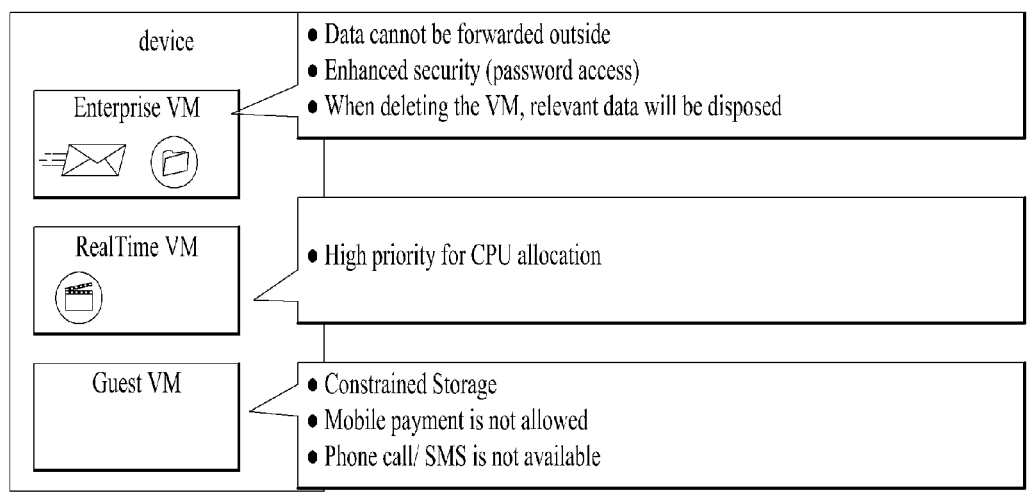
FIG. 1 is a diagram showing virtual machines (VMs) which may be configured on one device.

The present invention relates to virtual machines. However, the present invention is not limited to virtual machines and is applicable to all systems and methods to which the technical sprits of the present invention are applicable.

Technical terms used in this specification are used merely to illustrate specific embodiments, and it should be understood that they are not intended to limit the present disclosure. So long as not defined otherwise, all terms used herein including technical terms may have the same meaning as those generally understood by an ordinary person skilled in the art to which the present disclosure pertains, and should not be construed in an excessively comprehensive or extremely restrictive manner. In addition, if a technical term used in the description of the present disclosure is an erroneous term that fails to clearly express the idea of the present disclosure, it should be replaced by a technical term that can be properly understood by those skilled in the art. In addition, general terms used in the description of the present disclosure should be construed according to definitions in dictionaries or according to context, and should not be construed in an excessively restrictive manner.

Exemplary embodiments of the present invention will be described below in detail with reference to the accompanying drawings in which the same reference numbers are used throughout this specification to refer to the same or like parts. In describing the present invention, a detailed description of known functions and configurations will be omitted when it may obscure the subject matter of the present invention. The accompanying drawings are used to help easily understood the technical idea of the present invention and it should be understood that the idea of the present invention is not limited by the accompanying drawings. The idea of the present invention should be construed to extend to any alterations, equivalents and substitutions besides the accompanying drawings.

Although the term 'device' is illustrated in the drawings, the device may be a type of portable equipment having a communication function, such as a cellular phone, a Personal Digital Assistant (PDA), a smartphone, a wireless modem, and a laptop, or may be a type of fixed equipment, such as a personal computer (PC) and a vehicle-mounted device. In addition, in the present specification, the device may be called User Equipment (UE), Mobile Equipment (ME), Mobile Station (MS), User Terminal (UT), Subscriber Station (SS), wireless device, handheld device, Access Terminal (AT) or terminal.

FIG. 1 is a diagram showing virtual machines (VMs) which may be configured on one device.

Referring to FIG. 1, for example, a plurality of VMs including an enterprise VM, a real-time VM and a guest VM may be configured on one device. Since the enterprise VM provides improved security, data may not be delivered to an external device and related data is disposed of when a VM is deleted. The real-time VM is a VM for a real-time operation and has high priority upon allocation of a CPU. The guest VM has a restricted storage space and is restricted in terms of mobile payment or phone call/SMS.

In order for a remote server to create such a VM, a VM image is necessary. The remote server should transmit the VM image to a terminal and a process of creating a VM may be changed according to the type of the VM image. The VM image may include a type for creating only one VM and a type for continuously creating a plurality of VMs. The server should distinguishably create two types of VMs. VMware or other conventional technology does not consider two types of VMs and cannot control a VM creation process and a process for delivering a VM image for creating a VM at a server.

VM management technology is problematic in the enterprise VM. In the enterprise VM, a virtual machine may be remotely locked in order to protect data of the enterprise. A user cannot access a locked VM. A lock/unlock operation by a remote server should not be influenced by an internal state (execution, stoppage, etc.) of a VM and should be independently performed. In the conventional technology, since a method for independently managing a lock/unlock operation and an internal state of a VM is not considered, execution of a locked VM is stopped. In this case, since a VM is preferentially locked to prevent a user from accessing the VM, a problem may occur upon virus infection examination of the VM, security policy establishment or integrity check of an execution environment. That is, since the locked VM cannot be executed, the remote server cannot be connected to an internal process of the VM. Accordingly, in order to perform the above-described examination, the VM is transmitted to the server and is directly examined in the server.

If a VM is locked, a user cannot access the VM and a remote server should unlock the VM. That is, only the server can lock/unlock the VM. If the VM is locked, when a server key or another network configuration is incorrectly configured in the terminal and a remote server cannot access the terminal, the locked VM cannot be unlocked. When a specific user attempts to unlock a locked VM, the user should request unlocking from the server via an interface such as a web interface and the server should unlock the locked VM according to the user request. Such a scenario has disadvantages that, when a specific user unlocks a VM, the user should request unlocking from a remote server. If a process of sending a request to a remote server uses a web interface, complicated procedures including web login, selection of a VM to be unlocked and a request for unlocking a selected VM should be performed. Accordingly, in the conventional technology, a specific user cannot stably and conveniently unlock a locked VM.

The term device management for VM indicates management of firmware update or software installation/update/deletion, remote control, etc. of a VM and is an extension of a management function of a terminal to a virtual machine, which is similar to a device management function of a terminal. For reference, such device management for VM is different from the above-described VM management (e.g., VM creation or deletion) and is restricted to device management for a created VM. Open mobile alliance (OMA) device management (DM) technology is used for terminal management and is applicable to device management for VM. When the OMA DM technology used for terminal management is applied to a VM, the existing OMA DM technology may be used without developing separate technology for device management for VM and thus efficient device management for VM is possible. In order to apply OMA DM to device management for VM, a VM may include an OMA DM client. However, whenever a VM is created, an OMA DM client should be created, a new device identifier (ID) should be allocated to a new OMA DM client, and bootstrap should be performed. Accordingly, in order to apply existing OMA DM technology to device management for VM, technology of managing a plurality of VMs using a single DM client included in a terminal is necessary.

Figure 2:
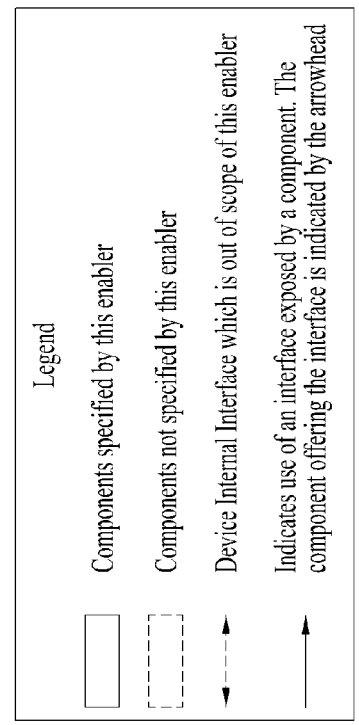
FIG. 2 is a diagram showing virtualization management object architecture based on open mobile alliance (OMA) device management (DM) architecture.
Figure 2:
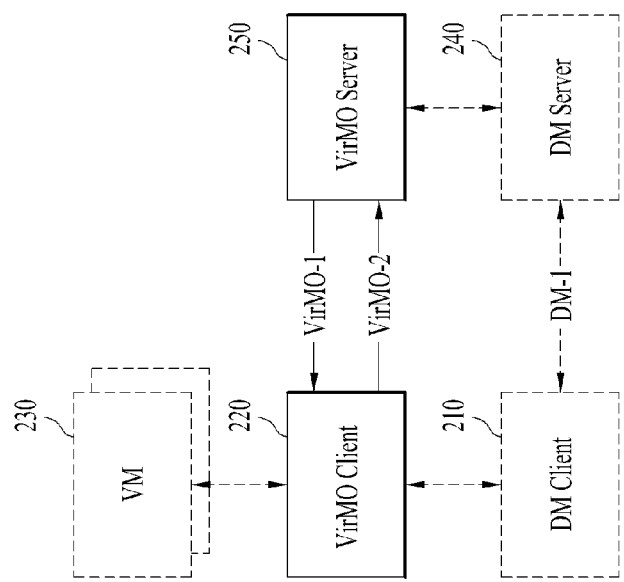

FIG. 2 is a diagram showing virtualization management object (VirMO) architecture based on open mobile alliance (OMA) device management (DM) architecture.

Referring to FIG. 2, five entities are shown. Each entity will now be described.

VirMO Client

A VirMO client (e.g., a VirMO client 220) is a logical entity which communicates with a VirMO server (a VirMO server 250) and is responsible for issuing a virtual machine management operation received from the VirMO server. The VirMO client transmits a result of such an operation to the VirMO server as a response and sends a generic alert to the VirMO server. An internal interface of a device may be used when the VirMO client manages a VM (e.g., a VM 230). Although the VirMO client 200 and the VirMO server 250 are shown as having separate interfaces, the VirMO client may use a DM client (e.g., a DM client 210) in order to communicate with the VirMO server.

VirMO Server

The VirMO server (e.g., the VirMO server 250) is a logical entity which communicates with the VirMO client (the VirMO client 220) and is responsible for issuing a VM management operation to the VirMO client. In addition, the VirMO server receives and consumes the generic alert from the VirMO client. Similarly, although the VirMO client 200 and the VirMO server 250 are shown having separate interfaces (e.g., VirMO-1 and VirMO-2), the VirMO server may use a DM server (e.g., a DM server 240) in order to communicate with the VirMO client.

DM Client

The VirMO client (e.g., the VirMO client 220) and the VirMO server (e.g., the VirMO server 250) may communicate with each other via a DM protocol (e.g., DM-1) which is an interface between the DM client (e.g., the DM client 210) and the DM server (e.g., the DM server 240). The DM client may internally communicate with the VirMO client which is responsible for managing a plurality of VMs. The DM server may check a management object in a device provided as a VirMO via the DM protocol and manipulate the management object. The DM client may transmit information generated by a client to a server using a generic alert mechanism and the VirMO client may also use such a mechanism.

DM Server

VirMO architecture requires a DM server component for DM message transmission and device discovery. The DM server (e.g., the DM server 240) may receive final notification from the VirMO client (e.g., the VirMO client 220) via the generic alert mechanism.

Virtual Machine (VM)

The virtual machine (VM) (e.g., the VM 230) may be managed by the VirMO server (e.g., the VirMO server 250) as an independent execution environment. The VirMO client may manipulate the VM via an internal device of a device according to an instruction received from the VirMO server.

Referring to FIG. 2, three interfaces are shown. Each interface will now be described.

VirMO-1

The VirMO-1 interface may enable the VirMO server (e.g., the VirMO server 250) to perform a virtual machine management operation with respect to the VirMO client (e.g., the VirMO client 220). In addition, the VirMO server may receive a state and result from the VirMO client via the VirMO-1 interface. The VirMO-1 interface may use a DM-1 interface of a lower layer.

VirMO-2

The VirMO-2 interface may enable the VirMO client (e.g., the VirMO client 220) to send a generic alert to the VirMO server (e.g., the VirMO server 250) using the DM-1 interface of the lower layer.

DM-1

The DM-1 interface is defined in an OMA DM enabler. The DM-1 interface enables a server to send a device management command to a client and enables the client to send a state and information back to the server.

Figure 3:
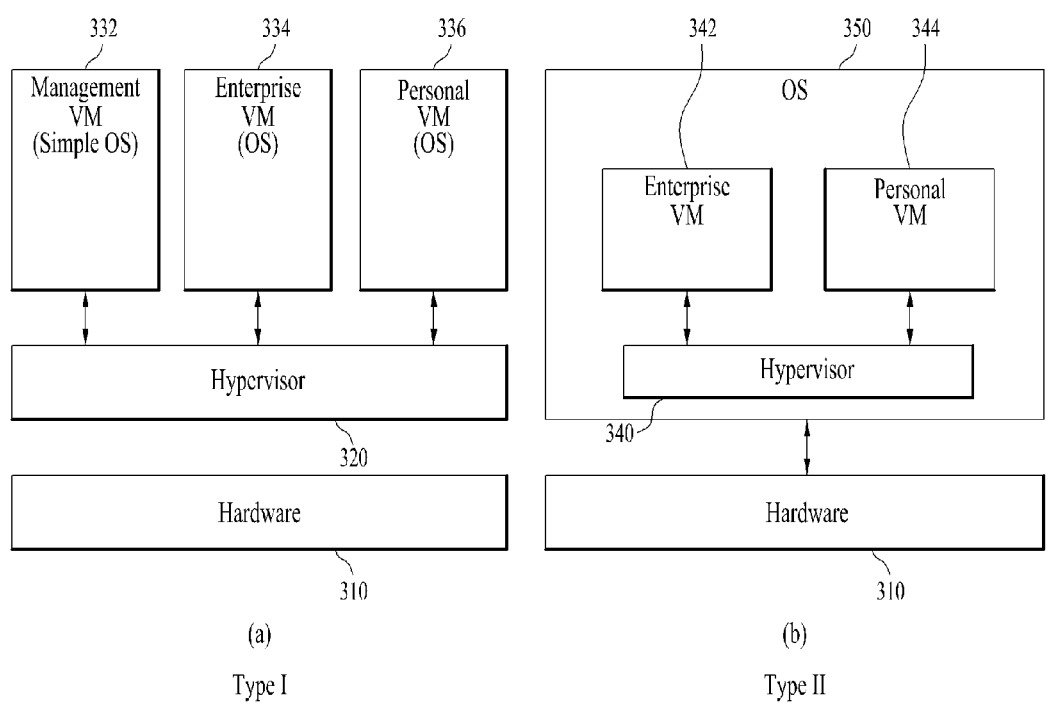
FIG. 3 is a diagram showing a virtualization type applicable to the present invention.

FIG. 3 is a diagram showing a virtualization type applicable to the present invention. Although two virtualization types such as type I and type II are shown as an example, a virtualization method is not limited thereto.

FIG. 3(a) shows type I virtualization. Referring to FIG. 3(a), in type I virtualization, a hypervisor (e.g., a hypervisor 320) directly operates on device hardware (e.g., hardware 310) and provides a hardware abstraction layer for OSs. Each OS may include one VM and the hypervisor manages a plurality of VMs (e.g., a management VM 332, an enterprise VM 334 and a personal VM 336) located thereon. The management VM serves as a virtual machine manager for managing the other VMs and may create and delete the other VMs. The management VM typically operates on a simple OS and the simple OS may have a minimal set of functions for providing restricted functions which are enough to provide such objects.

FIG. 3(b) shows type II hypervisor. Referring to FIG. 3(b), in type II virtualization, a hypervisor (e.g., a hypervisor 340) operates in a typical OS (e.g., an OS 350) and provides a hardware abstraction layer for VMs (e.g., an enterprise VM 342 and a personal VM 344) created in the OS.

Since virtualization may be performed via the hypervisor in the examples of FIG. 3, a virtualization type is referred to as hypervisor type. Accordingly, type I virtualization may be referred to as type I hypervisor and type II virtualization may be type II hypervisor.

Figure 4:
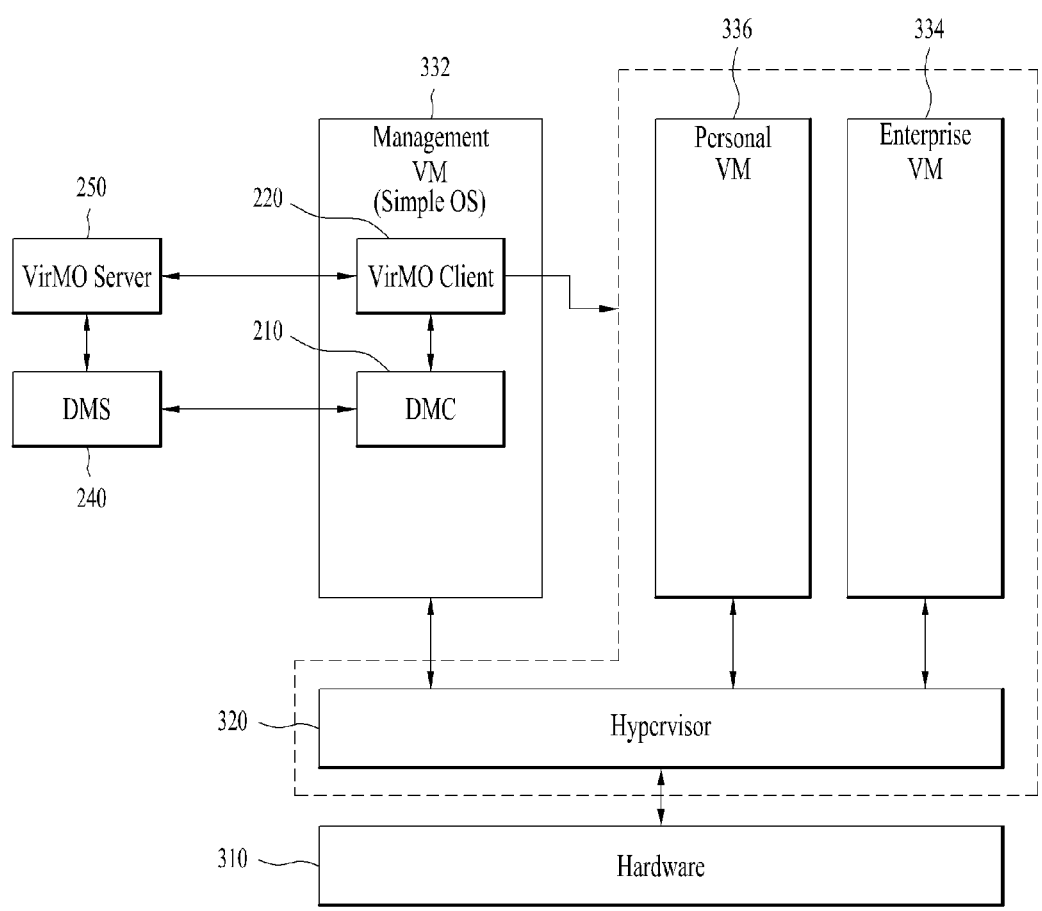
FIG. 4 is a diagram showing an example of implementing entities for virtualization management objects via type I virtualization.

FIG. 4 is a diagram showing an example of implementing entities for virtualization management objects via type I virtualization.

Referring to FIG. 4, the DM client (e.g., the DM client 210) and the VirMO client (e.g., the VirMO client 220) may be implemented in the management VM (e.g., the management VM 332). The VirMO client may communicate with each VM (e.g., the enterprise VM 334 or the personal VM 336) via the internal interface of the device. In addition, the VirMO client may communicate with the hypervisor (e.g., the hypervisor 320). The VirMO client may perform management operations received from the VirMO server (e.g., the VirMO server 250) to manage each VM.

Figure 5:
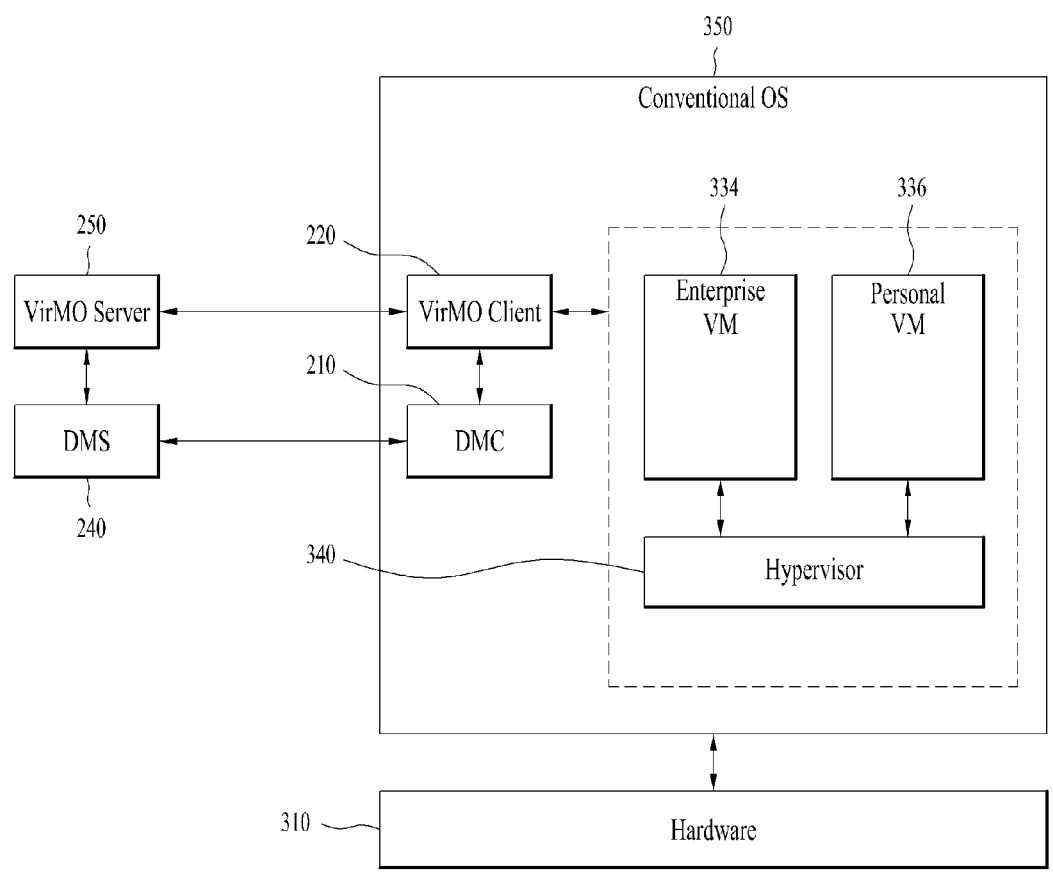
FIG. 5 is a diagram showing an example of implementing entities for virtualization management objects via type II virtualization.

FIG. 5 is a diagram showing an example of implementing entities for virtualization management objects via type II virtualization.

Referring to FIG. 5, the VirMO client (e.g., the VirMO client 220) and the DM client (e.g., the DM client 210) may be implemented in the OS (e.g., the OS 350). The VirMO client may communicate with the hypervisor (e.g., the hypervisor 340) and each VM (e.g., the enterprise VM 334 or the personal VM 336) and perform management operations received from the VirMO server (e.g., the VirMO server 250).

As described with reference to FIGS. 4 and 5, the VirMO server may manage the VMs of the device. Such management operations may include CREATE, DELETE and SUSPEND. Such management operations may be performed by the VirMO client and the state of the VM may be changed as the result of performing the management operations. The state of the VM indicates a current condition of the VM.

Figure 6:
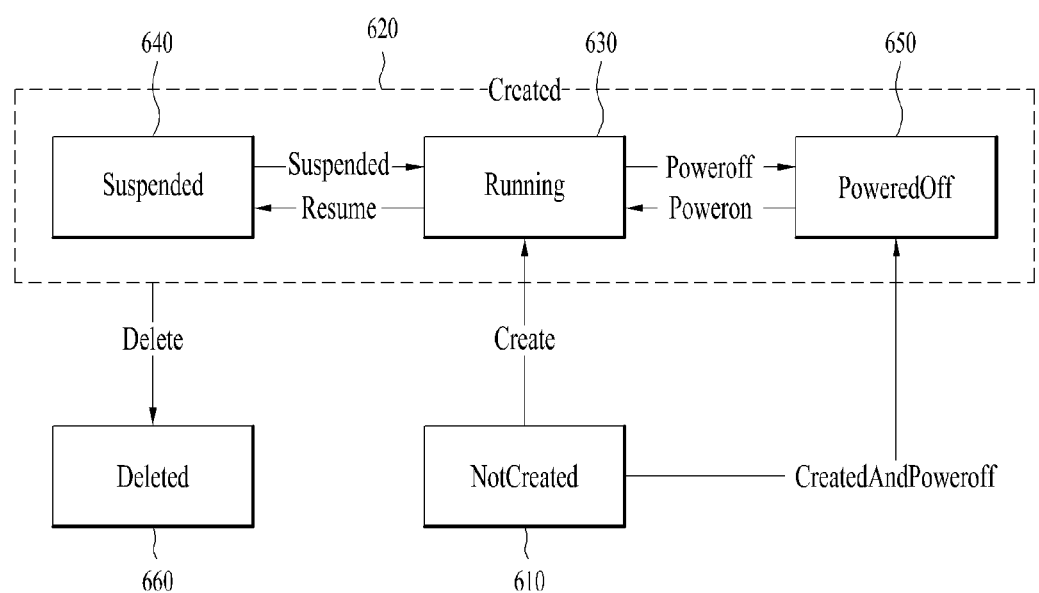
FIG. 6 is a diagram showing an example of a state machine including possible states and primitives of a VM.

FIG. 6 is a diagram showing an example of a state machine including possible states and primitives of a VM.

Referring to FIG. 6, for example, the possible states of the VM may include a NotCreated state 610, a Created state 620, a Running state 630, a Suspended state 640, a PoweredOff state 650 and a Deleted state 660. In addition, the VM management primitives trigger transition between such states. For example, the VM management primitives may include Create, Suspend, Resume, Delete, Poweroff, Poweron, CreateandPoweroff primitives.

being executed. In the Running state, an operating system, an application and other components may be installed and executed on the VM. Resources to be used to appropriately install and execute the VM may be allocated.

Suspended State

The Suspended state may mean that a VM is created but execution of the VM is not stopped. In the Suspended state, all applications and the operating system of the VM may not be executed. In addition, in the Suspended state, a current execution state of the VM may be stored. Once stopped, resources allocated for the VM may be released to be used for other purposes. However, the allocated resources may be reallocated, for example, when the VM transitions from the Suspended state to the Running state and resumes.

PoweredOff State

The PoweredOff state may mean that a VM is created but is powered off.

When the VM is powered off, the operating system or applications executed on the VM may also be finished. In order to re-execute the VM, the VM needs to be powered on via a normal operating system boot process.

Deleted State

The Deleted state may mean that a VM is completely deleted from a device and resources allocated to the VM are released so as not to be accessed. Data belonging to the VM may be destroyed. For example, in the Deleted state, the VirMO client may delete the VM from the device and delete nodes for the VM from a management tree.

Table 1 shows a description of primitives shown in FIG. 6, states to which the primitives are applicable, and post-primitive states.

TABLE 1

| Primitives | Descriptions | Applicable State | Post-Primitive State |
|---|---|---|---|
| Create | To create the VM. The created VM is in the Running state | NotCreated | Running |
| CreateAndPoweroff | To create the VM. The created VM is in the PoweredOff state. | NotCreated | PoweredOff |
| Suspend | To suspend the VM | Running | Suspended |
| Resume | To resume the VM making the VM running | Suspended | Running |
| Poweron | To power-on the VM | PoweredOff | Running |
| Poweroff | To power-off the VM | Running | PoweredOff |
| Delete | To delete the VM from the device | Created | Deleted |

The internal operations of the device and the state transition may be atomic. The atomic operation means that one operation cannot be divided into several operations. Accordingly, if state transition fails, the VirMO client may restore the operation and the VM may remain in a state before the operation is performed.

Each state shown in FIG. 6 will now be described.

NotCreated State

The NotCreated state refers to a state that a VM is not created in a device. Information used to create a VM may be preconfigured in the NotCreated state.

Created State

The Created state may include a Running state, a Suspended state and a PoweredOff state. For example, the Created state refers to a state that the Running state, the Suspended state and the PoweredOff state are collectively grouped. A VM is created in the Created state, which may mean that a virtual execution environment for a VM is set up and prepared.

Running State

The Running state may mean that a VM is created and a virtual execution environment for the VM is set up and is Each primitive will now be described with reference to Table 1.

Create Primitive

The Create primitive creates a VM. The Create primitive is applicable in the NotCreated state 610. The VM may transition to the Running state 630 by the Create primitive.

CreateAndPoweroff Primitive

The CreateAndPoweroff primitive creates a VM but the created VM is in a PoweredOff state 650. The CreateAndPoweroff primitive is applicable in the NotCreated state 610. The VM may transition to the PoweredOff state 650 by the CreateAndPoweroff primitive.

Resume Primitive

The resume primitive resumes a VM to execute the VM. The resume primitive is applicable in the Suspended state 640 and the VM may transition to the Running state 630 by the Resume primitive.

Suspend Primitive

The Suspend primitive stops a VM. The Suspend primitive is applicable in the Running state 630 and the VM may transition to the Suspended state 640 by the Suspend primitive.

Poweron Primitive

The Poweron primitive powers a VM on. The Poweron primitive is applicable in the Poweredon state 650 and the VM may transition to the Running state 630 by the Poweron primitive.

Poweroff Primitive

The Poweroff primitive powers a VM off. The Poweroff primitive is applicable in the Running state 630 and the VM may transition to the Poweredoff state 650 by the Poweroff primitive.

Delete Primitive

The Delete primitive deletes a VM from a device. The Delete primitive is applicable in the Created state 620 and the VM may transition to a Deleted state 660 by the Delete primitive.

The states and primitives according to the present invention are not limited to the states and primitives shown in FIG. 6 and may include other states and primitives. For example, the state machine according to the present invention may include a Deleting state, a Foreground state, a Background state, a Locked state and an Unlocked state. In addition, the state machine according to the present invention may include Front, Back, Lock, Unlock, CreateSuspend primitives.

Figure 7:
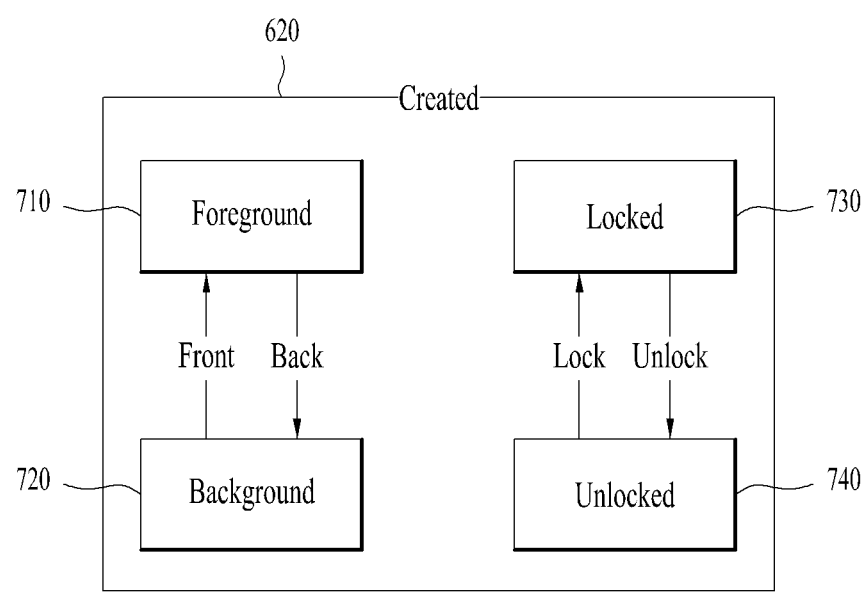
FIG. 7 is a diagram showing an example of a state machine including possible states and primitives of an additional VM.

FIG. 7 is a diagram showing an example of a state machine including possible states and primitives of an additional VM.

Referring to FIG. 7, in the Created state 620, the VM may include a Foreground state 710 and a Background state 720. These states will now be described.

Foreground State

The Foreground state refers to a state that a VM directly exchanges information and interacts with a user. In the foreground state, the VM has input focus and may interact with the user using an input/output (I/O) device and a user interface. For example, the user may interact with the VM using a user interface (UI) device such as a keyboard, a mouse, a microphone or a touchscreen. The VM should be in the Foreground state in order to interact with the user. Since the number of VMs which may interact with the user at a specific time is one, a maximum number of VMs in the Foreground state may be 1.

Background State

The background state refers to a state that a VM cannot directly interact with a user. In the Background state, the VM does not have input focus and cannot interact with the user. The Foreground state and the Background state may not be supported according to the terminal.

Separately from or additionally to the Foreground state and the Background state, in the Created state 620, the VM may include a Locked state 730 and an Unlocked state 740. These states will now be described.

Locked State

The Locked state refers to a state in which a VM is locked. In the Locked state, unauthorized access to the VM may be impossible. That is, in the Locked state, the VM may be accessed by an authorized entity (or a user) only via authentication information. For example, the Locked state may refer to a state in which an initial screen of a terminal is locked.

Unlocked State

The Unlocked state refers to a state in which access to a VM is not restricted as opposed to the Locked state. In the Unlocked state, locked functions of the VM may be used again. The Locked state and the Unlocked state may not be supported according to the terminal.

In addition, although not shown in FIG. 7, the VM may include a Deleting state. The Deleting state indicates that a VM is being deleted by the delete primitive. It may take significant time to delete the VM and the VM in the Deleting state may remain in the Running state or the Suspended state. Thus, the VirMO sever cannot accurately check the state of the VM. Accordingly, the VM in the Deleting state may be restricted when a management operation is performed.

Deleting State

The Deleting state refers to a state that a VirMO client starts to delete a VM but the VM is not completely deleted. When the Delete primitive is executed, the VM first transitions to the Deleting state and a process of deleting the VM from the terminal is performed. If deletion of the VM is completed, the VM transitions to the Deleted state. In order to enable the VM to transition from the Deleting state to the Deleted state, a separate primitive is not necessary and the terminal is automatically updated depending on whether deletion of the VM is completed. In the Deleting state, the VirMO client cannot accurately perform the management operation for the VM.

Table 2 shows a description of the above-described additional primitives, states to which the primitives are applicable, and post-primitive states.

TABLE 2

| Primitives | Descriptions | Applicable State | Post-Primitive State |
| --- | --- | --- | --- |
| CreateSuspend | To create the VM. The created VM is in the Suspended state | NotCreated | Suspended |
| Front | To transit the VM to the Foreground state | Created:Backgound | Created:Foreground |
| Back | To transit the VM to the Background state | Created:Foreground | Created:Background |
| Lock | To lock the VM | Created:Unlocked | Created:Locked |
| Unlock | To unlock the VM | Created:Locked | Created:Unlocked |

Each primitive will now be described with reference to Table 2.

CreateSuspend Primitive

The CreateSuspend primitive creates a VM but the created VM is in the Suspended state 640. The CreateSuspend primitive is applicable in the NotCreated state 610 and the VM may transition to the Suspended state 640 by the Create primitive.

Front Primitive

The Front primitive enables the created VM to be in the Foreground state 710. The Front primitive is applicable in the Background state 720 and the VM may transition to the Foreground state 710 by the Front primitive.

Back Primitive

The Back primitive enables the created VM to be in the Background state 720. The Back primitive is applicable in the Foreground state 710 and the VM may transition to the Background state 720 by the Back primitive.

Lock Primitive

The Lock primitive locks a VM. The Lock primitive is applicable in the Unlocked state 740 and the VM may transition to the Locked state 730 by the Lock primitive.

Unlock Primitive

The Unlock primitive unlocks a VM. The Unlock primitive is applicable in the Locked state 730 and the VM may transition to the Unlocked state 740 by the Unlock primitive.

Although the states to which the present invention is applicable and the primitive related thereto have been described above, the present invention is not limited to these states and primitives. In addition, some of the above-described states and primitives may be omitted according to embodiments. In addition, the above-described states and primitives may be combined if necessary according to embodiments. For example, the Created state may include only the Suspended state and the Running state, and the PoweredOff state may be excluded. Accordingly, the CreateAndPoweroff primitive may be excluded. As another example, the PowereOff state may be excluded from the Created state and a CreateAndSuspend primitive may be included instead of the CreateAndPoweroff primitve.

Figure 8:
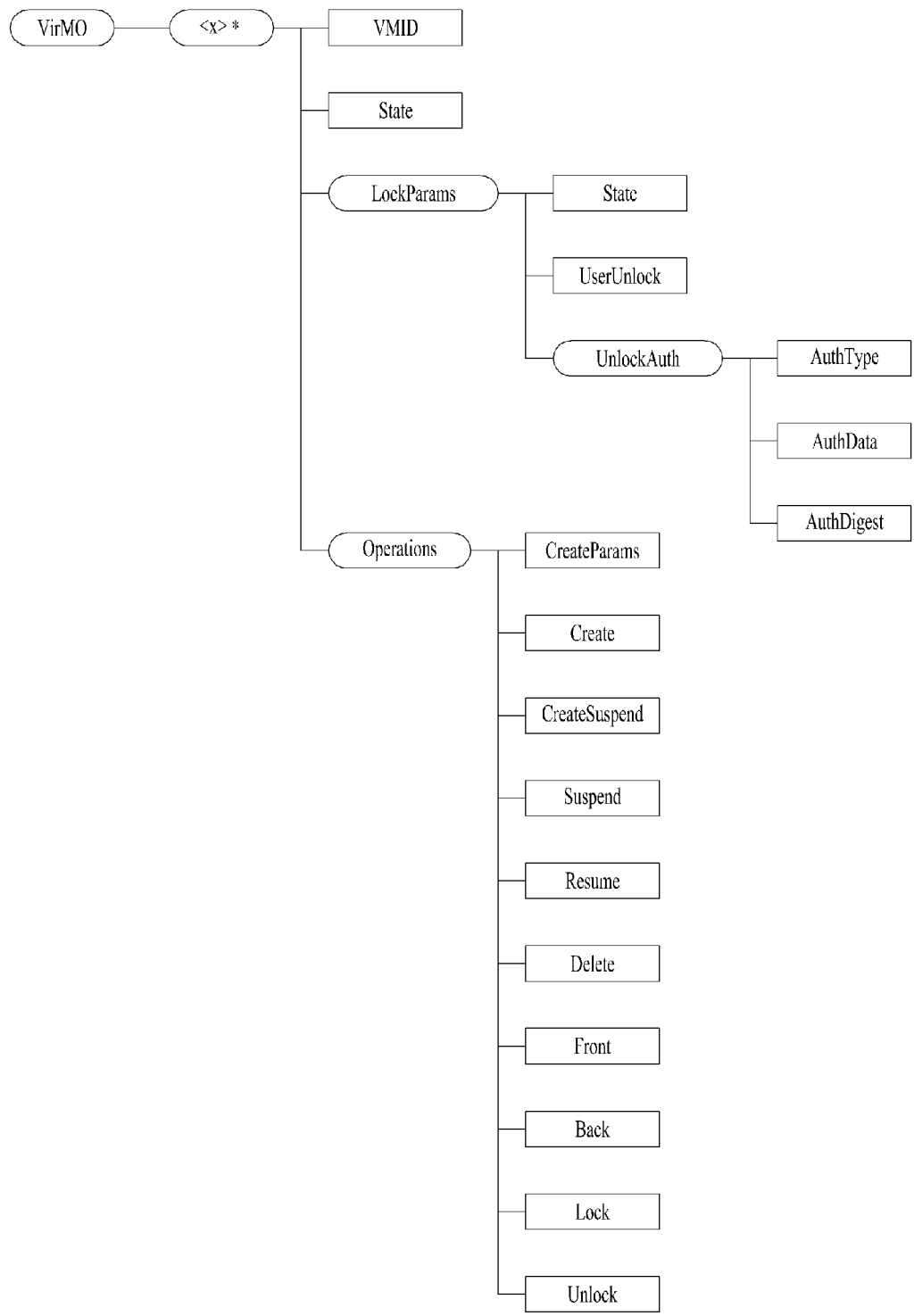
FIG. 8 is a diagram showing an example of a virtualization management object for VM management.

FIG. 8 is a diagram showing an example of a virtualization management object for VM management. The virtualization management object (VirMO) provides an interface used to manage a virtual machine (VM) between a VirMO server and a VirMO client. The VirMO may be included in a device management tree of a terminal.

Referring to FIG. 8, the VirMO may include a plurality of nodes. Each node will now be described. In the following description, a tree occurrence indicates the number of times of occurrence of each node in the tree structure, "One" indicates that a node occurs once, "ZeroOrMore" indicates that a node occurs zero or more, and "ZeroOrOne" indicates that a node occurs zero or once. In addition, format indicates the format of information, "int" indicates an integer format, "bin" indicates a bindary format, "chr" indicates a character format, "node" indicates an interior object of a tree, and "null" indicates that information is not present. A minimum access type (Min. Access Type) indicates an operation type, which each node is authorized to access, "Get" indicates that a Get command is minimally allowed, "No Replace" indicates that a replace command is allowed, and "Exec" indicates that an execution command (e.g., Exec. Command) is minimally allowed.

In addition, in the present specification, the node refers to an entity which may be managed by management operations performed via an OMA DM protocol. A component may be referred to as a node if this configures a management tree structure. For example, in the management tree, a root node may indicate a device. In addition, in the management tree, a node may indicate entities included in a device. For example, the node may indicate a virtual machine. In addition, the node may have a variety of information or child nodes.

VirMO

| Tree Occurrence | Format | Min. Access Types |
| --- | --- | --- |
| One | node | Get |

The VirMO node is a root node for a virtualization MO. In the DM tree, the location of the virtualization MO is determined by an ancestor element of this node. An identifier (e.g., MOID) of the virtualization MO may be "urn:oma:mo:oma-VirMO:1.0" for example.

VirMO/<x>

| Tree Occurrence | Format | Min. Access Types |
| --- | --- | --- |
| ZeroOrMore | node | Get |

The VirMO/<x> node is a placeholder for parameters for a specific virtual machine. The parameters of the managed virtual machines are available under this node.

VirMO/<x>/VMID

| Tree Occurrence | Format | Min. Access Types |
| --- | --- | --- |
| One | chr | Get, No Replace |

The VirMO/<x>/VMID node has a character value and specifies an identifier of a virtual machine. The value of this node may be allocated by a VirMO client and is unique in the virtualization MO.

VirMO/<x>/State

| Tree Occurrence | Format | Min. Access Types |
| --- | --- | --- |
| One | int | Get, No Replace |

The VirMO/<x>/State node has an integer value and specifies a current state of a virtual machine. The value of this node may be configured by a VirMO client and is as follows.

| Valid Value | Descriptions |
| --- | --- |
| 0 | NotCreated state |
| 1 | PoweredOff state |
| 2 | Running state |
| 3 | Suspended state |
| 4 | Deleted state |

These state values are exemplary and may be changed according to embodiments. For example, the Running state may have a value of 1, the Suspended state may have a value of 2 and the Deleted state may have a value of 3. As another example, the Running state may have a value of 1, the Suspended state may have a value of 2, the Deleting state may have a value of 3 and the Deleted State may have a value of 4. In addition, other combinations of the states and values are possible.

VirMO/<x>/Operations

| Tree Occurrence | Format | Min. Access Types |
| --- | --- | --- |
| One | node | Get |

The VirMO/<x>/Operations node is a parent node for operations supported by the virtualization MO. This node is a sub-tree for providing a set of operations used for VM management.

VirMO/<x>/Operations/Create

| Tree Occurrence | Format | Min. Access Types |
|---|---|---|
| One | null | Exec |

The VirMO/<x>/Operations/Create node may be used as an execution command for enabling a VirMO server to create a virtual machine. The created virtual machine may be in the Running state.

VirMO/<x>/Operations/CreateParams

| Tree Occurrence | Format | Min. Access Types |
|---|---|---|
| One | chr | Get |

The VirMO/<x>/Operations/CreateParams node specifies parameters used to create a VM. A VirMO server may configure parameters in the VirMO/<x>/Operations/CreateParams node before executing the Create node. After the CreateParams node is configured, the VirMO server may execute the Create node and a device may create a VM according to the CreateParams node. The parameters may be configured as a sequence of "key=value" pairs for example and these pairs may be identified by ampersand "&". Exemplary parameters are shown as follows but extension parameters specified by a terminal vendor are possible. The VirMO server and the VirMO client may support all or some of the following parameters according to embodiments.

| Parameters | Descriptions |
|---|---|
| DuplicateFrom=<VMID> | The created VM should be duplicated from the specified VM by the <VMID>. |
| ImgID=<ImgID> | The VirMO Client uses the image specified by the <ImgID> to create the VM. The <ImgID> is one of the ImgIDs in the VM Image MO. |
| DeleteSubTree=<bool> | If <bool> is true, the VM image sub-tree under the VMImgMO node used for creating the VM is deleted. If <bool> is false, the sub-tree for the VM image will remain, and can be used for creating other VMs over and over again. If not specified, the default value is false. |
| Running=<bool> | If <bool> is true, the created VM will be in the Running state. If <bool> is false, the created VM will be in the PowerOff state. If not specified, the default value is true. |

The DuplicateFrom parameter may be used when a created VM is duplicated from a VM specified by a <VMID> value. A VirMO/<x> sub-tree of the created VM may have the same configuration as an original VM specified by the <VMID> value. However, even in this case, the VMID should be different from the original VM and state nodes may also be different from each other.

The ImgID parameter specifies a VM image used to create a VM. The <img_id> value may be one of values of the VMImgMO/<x>/ImgID node.

The DeleteSubTree parameter has a Boolean value. If the value thereof is true, a VM image sub-tree under the VMImgMO node used to create a VM is deleted. If the value thereof is false, the sub-tree for the VM image remains and can be used to create other VMs over and over again. The default value may be false.

The Running parameter has a Boolean value. If the value thereof is true, the created VM may be in the Running state.

If the value thereof is false, the created VM may be in the PoweredOff state. The default value may be true.

VirMO/<x>/Operations/CreateSuspend

| Tree Occurrence | Format | Min. Access Types |
|---|---|---|
| One | null | Exec |

The VirMO/<x>/Operations/CreateSuspend node may be used as an execution command (e.g., Exec command) for enabling a VirMO server to create a virtual machine. However, unlike the Create node, the created virtual machine is in the Suspended state.

VirMO/<x>/Operations/Suspend

| Tree Occurrence | Format | Min. Access Types |
|---|---|---|
| One | null | Exec |

The VirMO/<x>/Operations/Suspend node may be used as an execution command (e.g., Exec command) for enabling a VirMO server to suspend a virtual machine. However, if execution is successful, the VM is in the Suspended state.

VirMO/<x>/Operations/Resume

| Tree Occurrence | Format | Min. Access Types |
|---|---|---|
| One | null | Exec |

The VirMO/<x>/Operations/Resume node may be used as an execution command (e.g., Exec command) for enabling a VirMO server to resume a virtual machine. By this operation, the state of the VM transitions from the Suspended state to the Running state.

VirMO/<x>/Operations/Delete

| Tree Occurrence | Format | Min. Access Types |
|---|---|---|
| One | null | Exec |

The VirMO/<x>Operations/Delete node may be used as an execution command (e.g., Exec command) for enabling a VirMO server to delete a virtual machine. The virtual machine in the Created state may be deleted.

VirMO/<x>/Operations/Front

| Tree Occurrence | Format | Min. Access Types |
|---|---|---|
| One | null | Exec |

The VirMO/<x>/Operations/Front node may be used as an execution command (e.g., Exec command) for enabling a VirMO server to switch a virtual machine to a Foreground state. Only a VM in the Created state (that is, the Running state, the Suspended state or the PoweredOff state) may transition. By this command, the VM may be changed from the Background state to the Foreground state. If only one VM can be in the Foreground state, another VM in the Foreground state may transition to the Background state.

VirMO/<x>/Operations/Back

| Tree Occurrence | Format | Min. Access Types |
|---|---|---|
| One | null | Exec |

The VirMO/<x>Operations/Back node may be used as an execution command (e.g., Exec command) for enabling a VirMO server to switch a virtual machine to a Background state. Only a VM in the Created state (that is, the Running state, the Suspended state or the PoweredOff state) may transition. By this command, the VM may be changed from the Foreground state to the Background state.

VirMO/<x>/Operations/Lock

| Tree Occurrence | Format | Min. Access Types |
|---|---|---|
| One | null | Exec |

The VirMO/<x>/Operations/Lock node may be used as an execution command (e.g., Exec command) for enabling a VirMO server to lock a virtual machine.

VirMO/<x>/Operations/Unlock

| Tree Occurrence | Format | Min. Access Types |
|---|---|---|
| One | null | Exec |

The VirMO/<x>/Operations/Unlock node may be used as an execution command (e.g., Exec command) for enabling a VirMO server to unlock a virtual machine.

VirMO/<x>/LockParams

| Tree Occurrence | Format | Min. Access Types |
|---|---|---|
| One | node | Get |

The VirMO/<x>/LockParams node is a parent node for parameters related to a lock operation.

VirMO/<x>/LockParams/State

| Tree Occurrence | Format | Min. Access Types |
|---|---|---|
| One | int | Get |

The VirMO/<x>/LockParams/State node specifies a current lock state of a virtual machine. This value may be configured by a VirMO client and may have the following values.

| Valid Value | Descriptions |
|---|---|
| 0 | The VM is unlocked. |
| 1 | The VM is locked. |

For example, when the VirMO/<x>/LockParams/State node has a value of 0, then this indicates that a VM is in the Unlocked state. When the VirMO/<x>/LockParams/State node has a value of 1, this indicates that a VM is in the Locked state. The value of the node is not limited thereto and may be changed according to embodiment.

VirMO/<x>/LockParams/UserUnlock

| Tree Occurrence | Format | Min. Access Types |
|---|---|---|
| One | bool | Get |

The value of the VirMO/<x>/LockParams/UserUnlock node specifies whether a user is allowed to unlock a locked virtual machine. This node may have a Boolean value. For example, if the value of the node is set to true, the user is allowed to unlock the virtual machine even when the virtual machine identified by the VirMO/<x>/VMID node is locked. If the value of the node is set to false, the user is not allowed to unlock the locked virtual machine. However, an authorized VirMO server may unlock the virtual machine regardless of the value of the node.

VirMO/<x>/LockParams/UnlockAuth

| Tree Occurrence | Format | Min. Access Types |
|---|---|---|
| ZeroOrOne | node | Get |

The VirMO/<x>/LockParams/UnlockAuth node is a parent node for parameters related to unlock authorization information. A VirMO client may authorize a user using this information when the user unlocks a VM. This node may be present when the value of the UserUnlock node is set to true.

VirMO/<x>/LockParams/UnlockAuth/AuthType

| Tree Occurrence | Format | Min. Access Types |
|---|---|---|
| One | int | Get |

The VirMO/<x>/LockParams/UnlockAuth/AuthType node may specify an authorization type for unlocking a virtual machine. This node may have the following integer value, for example.

| Values | Description |
|---|---|
| 0 | DIGEST-SHA256 as specified in RFC6234 |

For example, if the VirMO/<x>/LockParams/UnlockAuth/AuthType node has a value of 0, this may indicate a DIGEST-SHA256 TYPE specified in RFC6234.

VirMO/<x>/LockParams/UnlockAuth/AuthData

| Tree Occurrence | Format | Min. Access Types |
|---|---|---|
| One | bin | Get |

The VirMO/<x>/LockParams/UnlockAuth/AuthData node may specify authorization data related to an authorization type specified by an AuthType node.

VirMO/<x>/LockParams/UnlockAuth/AuthDigest

| Tree Occurrence | Format | Min. Access Types |
|---|---|---|
| One | bin | Get |

The VirMO/<x>/LockParams/UnlockAuth/AuthDigest node may specify an authorization digest related to an authorization type specified by an AuthType node.

Several nodes of the virtualization MO have been described above with reference to FIG. 8. However, such nodes are merely exemplary and other nodes may be further included according to embodiments. In addition, some of the above-described nodes may be excluded according to embodiments. In addition, the locations of the nodes may be changed according to embodiments. In addition, the names of the nodes may be changed according to embodiments.

For example, the virtualization MO may further include the following nodes.

VirMO/<x>/Operations/PowerOn

| Tree Occurrence | Format | Min. Access Types |
|---|---|---|
| One | null | Exec |

The VirMO/<x>/Operations/PowerOn node may be used as an execution command (e.g., Exec command) for enabling a VirMO server to power a virtual machine on.

VirMO/<x>/Operations/PowerOff

| Tree Occurrence | Format | Min. Access Types |
|---|---|---|
| One | null | Exec |

The VirMO/<x>/Operations/PowerOff node may be used as an execution command (e.g., Exec command) for enabling a VirMO server to power a virtual machine off.

As another example, nodes related to lock and unlock operations may be included under the VirMO/<x>/LockParams/Operations node. In this case, the Lock node which is related to the lock operation has the same property as the above-described VirMO/<x>/Operations/Lock node but may be located under the VirMO/<x>/LockParams/Operations node, not under the VirMO/<x>/Operations node. Similarly, the unlock node which is related to the unlock operation has the same property as the VirMO/<x>/Operations/Unlock node but may be located under the VirMO/<x>/LockParams/Operations node, not under the VirMO/<x>/Operations node.

Figure 9:
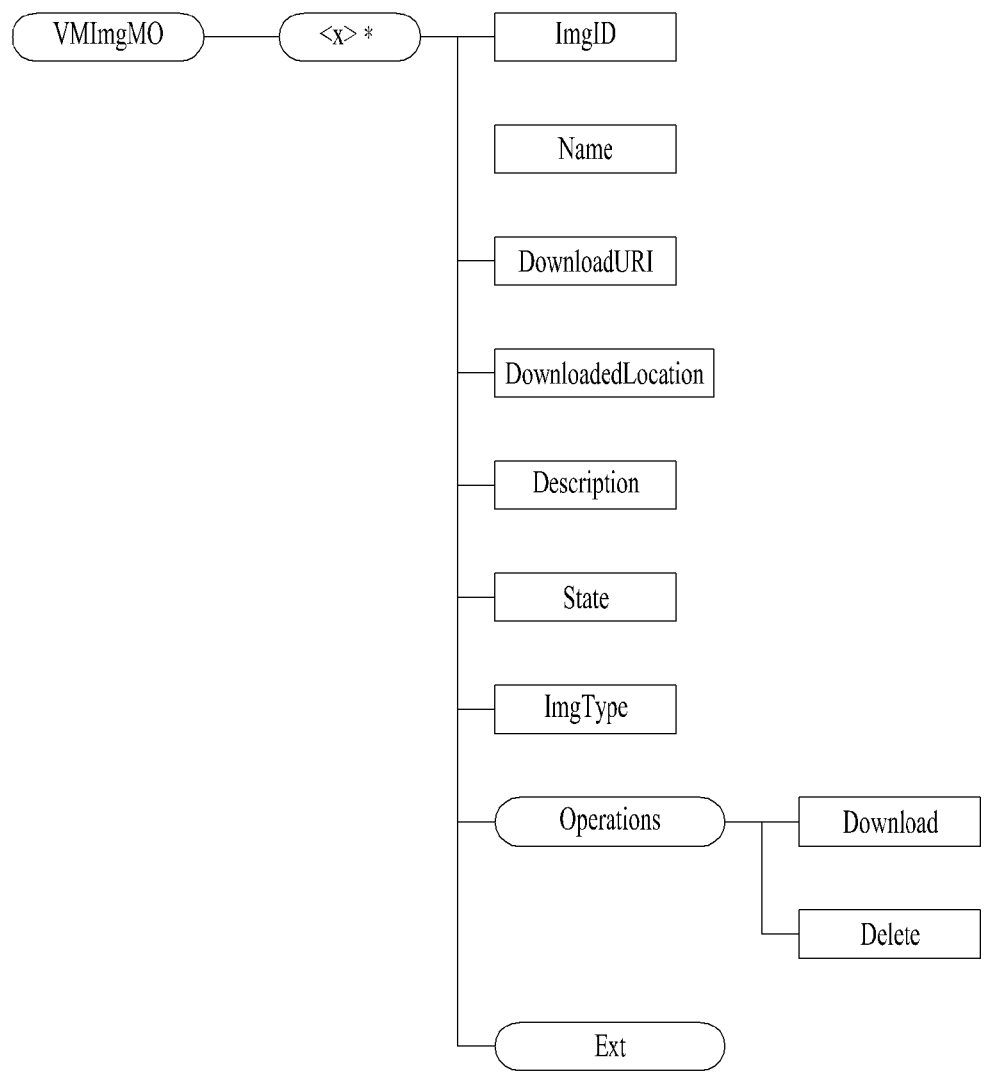
FIG. 9 is a diagram showing a virtual machine image management object.

FIG. 9 is a diagram showing a virtual machine image management object (VM Image MO). The VM image MO provides an interface between a VirMO server and a VirMO client, which may be used to manage virtual machine images. A VM image may serve as an install image for creating a virtual machine. The virtual machine image management object may be included in a device management tree of a terminal.

Referring to FIG. 9, nodes which may be included in the VM image MO are shown. The nodes included in the VM image node will now be described.

VMImgMO

| Tree Occurrence | Format | Min. Access Types |
|---|---|---|
| One | node | Get |

The VMImgMo node is a root node for a VM image MO. In a DM tree, the location of the VM image node is determined by an ancestor element of this node. An identifier (e.g., MOID) of the VM image MO may be "urn:oma:mo:oma-vmimgmo:1.0", for example.

VMImgMO/<x>

| Tree Occurrence | Format | Min. Access Types |
|---|---|---|
| ZeroOrMore | node | Get |

The VMImgMO/<x> node is a placeholder for parameters for a specific VM image. Parameters respectively corresponding to the managed VM images are available under this node.

VMImgMO/<x>/ImgID

| Tree Occurrence | Format | Min. Access Types |
|---|---|---|
| One | chr | Get |

The VMImgMO/<x>ImgID node has a character value and specifies an identifier of a VM image. The value of this node may be allocated by a VirMO client and is unique in the VM image MO.

VMImgMO/<x>/Name

| Tree Occurrence | Format | Min. Access Types |
|---|---|---|
| One | chr | Get |

The VMImgMO/<x>/Name node specifies the name of a VM image. For example, the name of the VM image may be "android_2.2_froyo". The value of this node may be configured by a VirMO server.

VMImgMO/<x>/Description

| Tree Occurrence | Format | Min. Access Types |
|---|---|---|
| ZeroOrOne | chr | Get |

The VMImgMO/<x>/Description node specifies a description of a VM image. The description of the VM image may be human readable.

VMImgMO/<x>/DownloadURI

| Tree Occurrence | Format | Min. Access Types |
|---|---|---|
| ZeroOrOne | chr | Get |

The VMImgMO/<x>/DownloadURI node specifies a uniform resource identifier (URI) used to download a VM image. The URI of this node may be used for download mechanisms such as HTTP GET [RFC2616] or Download Over the Air [DLOTA], for example.

VMImgMO/<x>/DownloadedLocation

| Tree Occurrence | Format | Min. Access Types |
|---|---|---|
| ZeroOrOne | chr | Get, No Replace |

The VMImgMO/<x>/DownloadedLocation node specifies a local path of a downloaded VM image. For example, the local path of the VM image may be "/sdcard/download/VirMO/images/android_2.2_froyo". The value of this node may be valid if the value of the VMImgMO/<x>/State node is a value (e.g., 2) indicating that download is completed.

The format of this value may be changed per platform. The value of this node may be configured by a VirMO client.

VMImgMO/<x>/State

| Tree Occurrence | Format | Min. Access Types |
|---|---|---|
| One | int | Get, No Replace |

The VMImgMO/<x>/State node specifies a current state of a VM image. The value of this node may be configured by a VirMO client. For example, this node may have the following values.

| Integer Value | Descriptions |
|---|---|
| 0 (Not Downloaded) | The download is not started, and no data is received. |
| 1 (Downloading) | The download has been started. |
| 2 (Downloaded) | The download is successfully finished, and all data has been received. |
| 3 (Download Failed) | The download is failed, and 0 or more bytes of data might be received. |

For example, if the node value is 0, download is not started and no data is received. If the node value is 1, download has been started. If the node value is 2, download is successfully finished and all data has been received. If the node value is 3, download failed and 0 or more bytes of data might be received. In addition, other combinations of the states and values are possible. These values are merely exemplary and different values may be used according to embodiments. Each value may indicate a state different from the illustrated state.

VMImgMO/<x>/ImgType

| Tree Occurrence | Format | Min. Access Types |
|---|---|---|
| One | chr | Get |

The VMImgMO/<x>/ImgType node specifies a content type (or a media type) of a VM image. A node value may be a multipurpose Internet mail extensions (MIME) media type. The value of this node may be configured by the VirMO server.

VMImgMO/<x>/Operations

| Tree Occurrence | Format | Min. Access Types |
|---|---|---|
| One | node | Get |

The VMImgMO/<x>/Operations node is a parent node for operations supported by this MO.

VMImgMO/<x>/Operations/Download

| Tree Occurrence | Format | Min. Access Types |
|---|---|---|
| One | null | Get |

The VMImgMO/<x>/Operations/Download node may be used as an execution command (e.g., Exec command) for downloading a VM image using the VMImgMO/<x>/Operations/DownloadURI node. After the VM image is completely downloaded, the VirMO client should accurately configure the VMImgMO/<x>/DownloadedLocation node. In addition, the VirMO client may send a VM image ready alert to the VirMO server in order to notify the VirMO server that download has been finished.

VMImgMO/<x>/Operations/Delete

| Tree Occurrence | Format | Min. Access Types |
|---|---|---|
| One | null | Get |

The VMImgMO/<x>/Operations/Delete node may be used as an execution command (e.g., Exec command) for deleting a VM image. If the VM image is completely or partially downloaded, the downloaded image may be deleted. If the image is deleted, a sub-tree under VMImgMO/<x> may be deleted.

VMImgMO/<x>/Ext

| Tree Occurrence | Format | Min. Access Types |
|---|---|---|
| One | node | Get |

The VMImgMO/<x>/Ext node is an extension node for storing information related to a VM image. This extension node may be used to store terminal vendor specific information.

Several nodes of a VM image MO have been described above with reference to FIG. 9. However, these nodes are merely exemplary and other nodes may be further included according to embodiments. Some of the above-described nodes may be excluded according to embodiments. In addition, the locations of the nodes may be changed according to embodiments. In addition, the names of the nodes may be changed according to embodiments. For example, the VMImgMO/<x>ImgType node may be referred to as VMImgMO/<x>/Mediatype node.

VM Management Operation Procedures

The VirMO server may deliver a VM image to the device using the above-described Virtualization MO (VirMO) and the VM image MO and create or delete a VM in or from the device.

Figure 10:
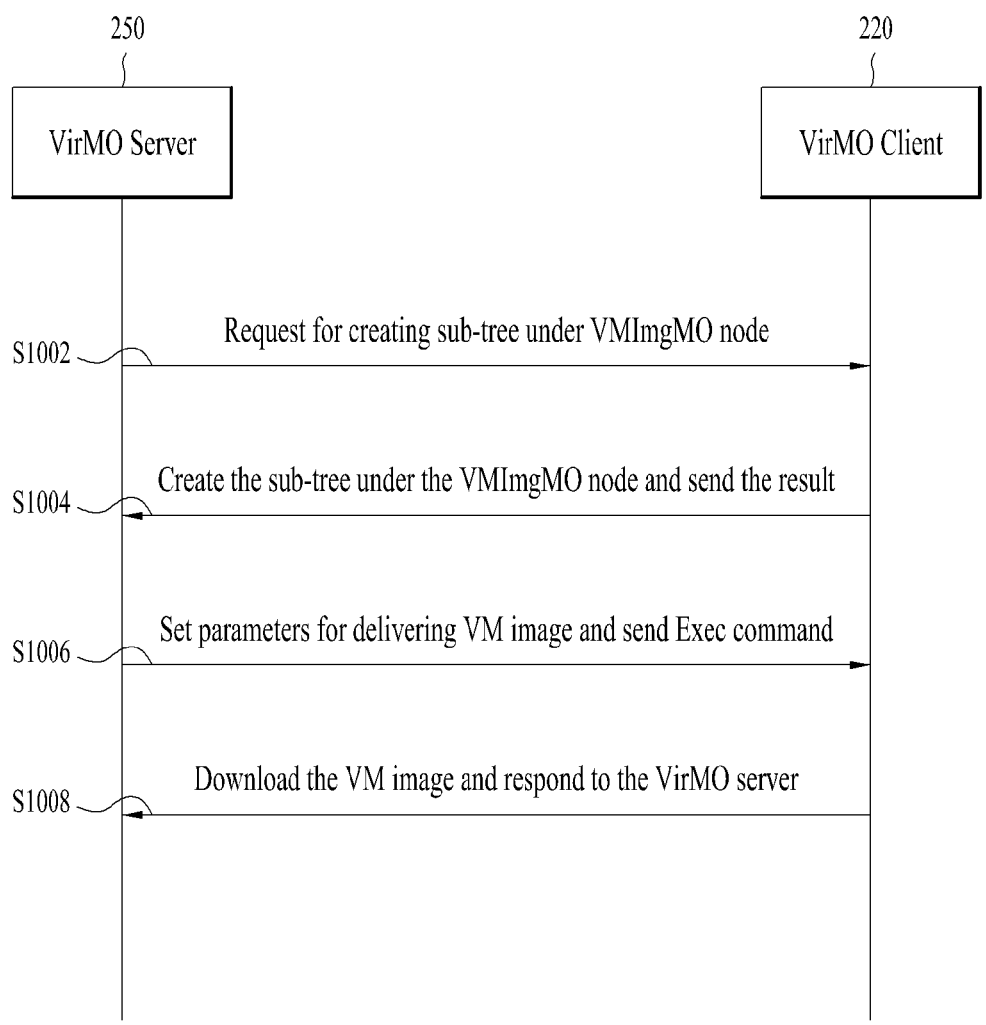
FIG. 10 is a procedure of, at a VirMO server, delivering a VM image to a device.

FIG. 10 is a procedure of, at a VirMO server 250, delivering a VM image to a device.

Referring to FIG. 10, in step S1002, the VirMO server 250 may send, to the VirMO client 220, a request to create a sub-tree under a VMImgMO node.

In step S1004, after receiving the request to create the sub-tree from the VirMO server 250, the VirMO client 220 may create the sub-tree under the VMImgMo node. The VirMO client 220 may configure the value of the VMImgMO/<x>/ImgID node and set the value of the VMImgMO/<x>State node to a value (e.g., Not downloaded or 0) indicating that the VM image is not downloaded. The VirMO client 220 may successfully process the request to create the sub-tree and then send the result (e.g., a status code) to the VirMO server 250.

In step S1006, the VirMO server 250 may appropriately configure parameters used to deliver the VM image. Then, the VirMO server 250 may send an execution command (e.g., Exec command) to the VMImgMO/<x>/Operations/Download node.

In step S1008, after receiving the execution command, the VirMO client 250 may start to download the VM image from the URI stored in the VMImgMO/<x>/DownloadURI node. For example, a replaceable download mechanism such as HTTP GET or Download Over the Air[DLOTA] may be used to download the VM image. The VirMO client 220 may appropriately update the VMImgMO/<x>/State node. When the VM image is completely downloaded, the VirMO client 220 may configure the VMImgMO/<x>/DownloadedLocation node. The VirMO client 220 may send a response to the VirMO server 250 using a synchronous reporting mechanism or an asynchronous reporting mechanism.

Figure 11:
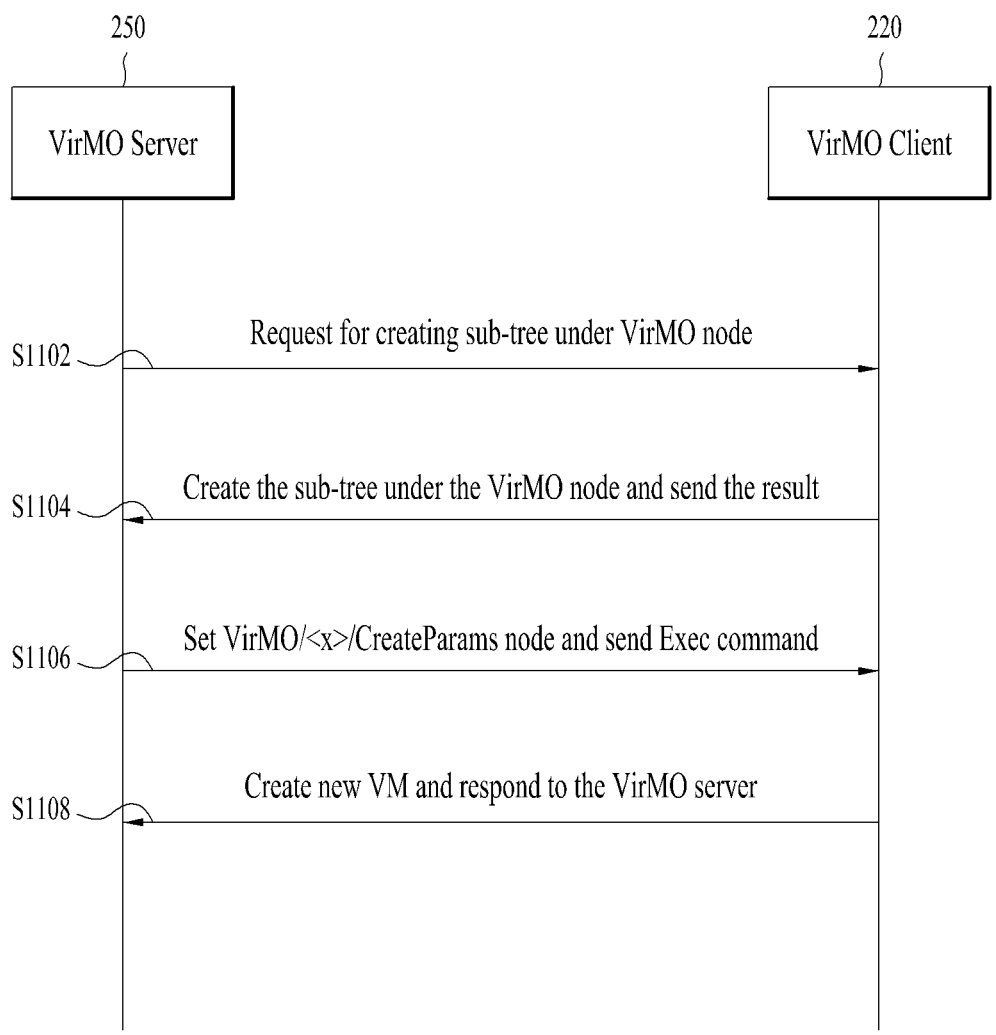
FIG. 11 is a diagram showing a procedure of, at a VirMO server, creating a virtual machine in a device.

FIG. 11 is a diagram showing a procedure of, at a VirMO server 250, creating a virtual machine in a device.

Referring to FIG. 11, in step S1102, the VirMO server 250 may send a request to create a sub-tree under the VirMO node to the VirMO client 220.

In step S1104, after receiving the request from the VirMO server 250, the VirMO client 220 may create the sub-tree under the VirMO node. The VirMO client 220 may allocate a value to the VirMO/<x>/VMID node and set the value of the VirMO/<x>/State node to a value (e.g., 0) indicating the NotCreated state. The VirMO client 220 may successfully process the request and send a result (e.g., a status code) to the VirMO server 250.

In step S1106, the VirMO server 250 may appropriately configure the VirMO/<x>/CreateParams node. Then, the VirMO server 250 may send an execution command (e.g., Exec command) to the VMImgMO/<x>/Operations/Create node in order to create a virtual machine.

In step S1108, the VirMO client 220 may create a new virtual machine according to the VMImgMO/<x>/CreateParams node and update the VMImgMO/<x>/State node, after receiving the execution command. The VirMO client 220 may send a response to the VirMO server 250 using a synchronous reporting mechanism or an asynchronous reporting mechanism.

Figure 12:
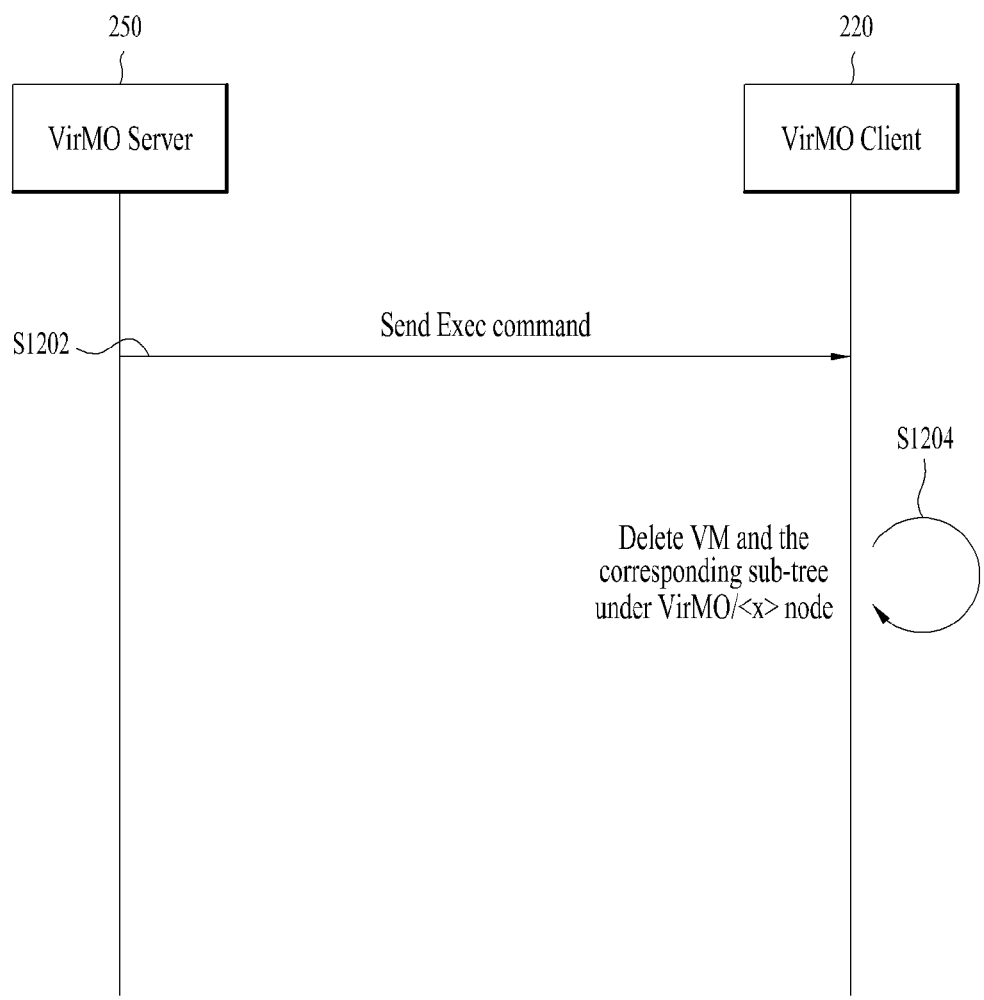
FIG. 12 is a diagram showing a procedure of, at a VirMO server, deleting a virtual machine from a device.

FIG. 12 is a diagram showing a procedure of, at a VirMO server 250, deleting a virtual machine from a device.

Referring to FIG. 12, in step S1202, the VirMO server 250 may send an execution command to the VirMO/<x>/Operations/Delete node.

In step S1204, after receiving execution command, the VirMO client 220 may delete the virtual machine from the device. At this time, the VirMO client 220 may delete the sub-tree under the VirMO/<x> node.

If the above-described deleting state is supported, the VirMO client 220 may set the state of the VM to the deleting state and then delete the VM and the sub-tree under the VirMO/<x> node.

Figure 13:
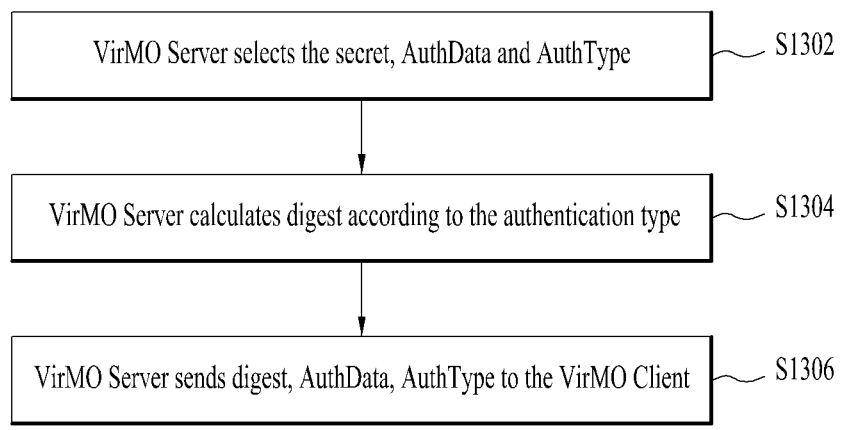
FIGS. 13 and 14 are diagrams showing procedures performed by a VirMO server and a VirMO client when a user unlocks a VM, respectively.
Figure 14:
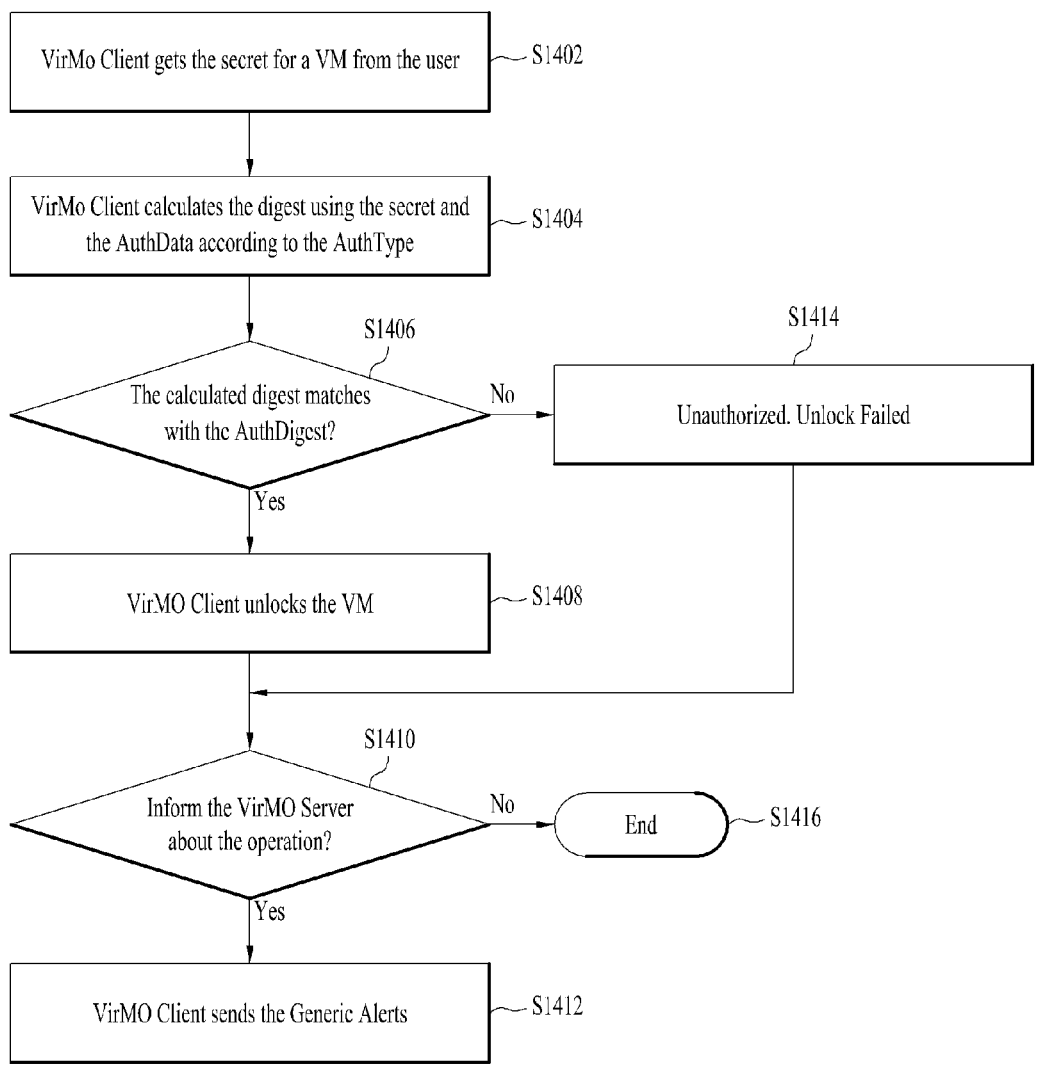

FIGS. 13 and 14 are diagrams showing procedures performed by a VirMO server and a VirMO client when a user unlocks a VM, respectively.

As described above, the virtual machine of the device may be locked by the remote VirMO server and unauthorized access may not be allowed. Locking the virtual machine may mean that the virtual machine is disabled to operate via arbitrary unauthorized access. The authorized VirMO server may unlock the virtual machine using a VirMO session. Alternatively, the user unlock the virtual machine via authentication secret (e.g., password or code) input. When the VM is unlocked, the VirMO server may configure authentication information (e.g., auth sub-tree) in order to enhance security. Such authentication information may be used to determine whether the user can unlock the VM.

If the VirMO/<x>/LockParams/UserUnlock node is true, the VirMO server may appropriately configure a VirMO/<x>/LockParams/UnlockAuth sub-tree used to authenticate a user. For example, an authentication type indicated by the VirMO/<x>/LockParams/UnlockAuth/AuthType node is shown in Table 3.

TABLE 3

| Value for "Auth/AuthType" | Descriptions |
| --- | --- |
| HTTP-BASIC | HTTP basic authentication done according to RFC 2617. |
| HTTP-DIGEST | HTTP digest authentication done according to RFC 2617. |
| BASIC | DM 'syncml:auth-basic' authentication as specified in [DMSEC]. |
| DIGEST | DM 'syncml:auth-md5' authentication as specified in [DMSEC]. |
| DIGEST-SHA256 | DIGEST-SHA256 as specified in RFC6234 |
| HMAC | DM 'syncml:auth-MAC' authentication as specified in [DMSEC]. |
| X509 | 'syncml:auth-X509' authentication done according to [REPPRO]. |

In Table 3, [DMSEC] means OMA-TS-DM_Security-V1_3, which is the OMA standard "OMA device Management Security" and [REPPRO] means OMA-TS-DM_RepPro-V1_3 "OMA Device Management Representation Protocol".

The authentication data stored in the VirMO/<x>/LockParams/UnlockAuth/AuthData node may operate as nonce and may be used for user authentication.

Referring to FIG. 13, a procedure of, at the VirMO server, configuring authentication information necessary for unlocking with respect to the terminal when the user unlocks the VM is shown.

In step S1302, the VirMO server selects secret, authentication data (AuthData) and authentication type (AuthType) necessary for user authentication. The secret is information to be input when the user unlocks the VM and only the user who knows the secret can unlock the VM. The authentication data is information necessary to compute a digest.

In step S1304, the VirMO server may compute a digest value according to the secret, the authentication data and the authentication type. The digest is computed by a hash function and may be calculated by the digest=H (secret: AuthData). That is, a value obtained by attaching the authentication data to the secret is substituted to the hash function to calculate a digest. The hash function may be changed according to the authentication type.

In step S1306, the VirMO server may send the authentication data, the digest and the authentication type to the VirMO client. In VirMO, the authentication data may be stored in AuthData (e.g., VirMO/<x>/LockParams/UnlockAuth/AuthData), the digest may be stored in AuthDigest (e.g., VirMO/<x>/LockParams/UnlockAuth/AuthDigest, and the authentication type may be stored in AuthType (e.g., VirMO/<x>/LockParams/UnlockAuth/AuthType).

Referring to FIG. 14, when the user unlocks the VM, a procedure of, at the VirMO client, receiving the secret from the user and performing user authentication is shown.

In step S1402, the VirMO client may receive the secret for unlocking a specific VM from the user.

In step S1404, the VirMO client computes a digest according to the authentication type (AuthType) using the received secret and the authentication data (AuthData). Computation of the digest may be equal to computation performed by the VirMO server in step S1304. For example, the digest may be calculated by digest=H (secret:AuthData). That is, data stored in the AuthData node (e.g., VirMO/<x>/LockParams/Unlockauth/AuthData) is attached to the secret received from the user and then the digest is computed using the hash function according to the authentication type (AuthType).

In step S1406, it may be determined whether the digest computed in step S1404 matches the data stored in the AuthDigest node (e.g., VirMO/<x>/LockParams/Unlock-Auth/AuthDigest). If so, the procedure progresses to step S1408 and, otherwise, the procedure progresses to step S1414.

When the user has accurately input the secret, in step S1408, user authentication is successfully performed to unlock the VM.

In step S1410, the VirMO client determines whether information related to the unlocking operation needs to be reported to the VirMO server. This determination may be made via predefined information or may be autonomously made by the VirMO client. If it is determined that the information needs to be reported to the VirMO server, the procedure progresses to the step S1412 and, otherwise, the procedure progresses to step S1416 and ends.

If it is determined that the information needs to be reported to the VirMO server, in step S1412, the VirMO client may send a generic alert to the VirMO server. This generic alert may include information such as an alert type, whether an unlocking operation is successful, and a time.

If it is determined that the secret input by the user is not accurate in step S1406, in step S1414, user authentication fails and thus the VM is not unlocked.

If it is determined that the information does not need to be reported to the VirMO server in step S1410, the unlocking operation ends.

Device Management for Virtual Machine

A virtual machine created in a device may be considered as another independent device in which an operating system and applications are operable. The virtual machine may be managed by a remote server as a separate device and management by a remote server may include firmware update, software installation/update/deletion, remote control, diagnosis and configuration. Such types of management may be referred to as device management for virtual machine.

For device management for VM, device management functions defined in open mobile alliance (OMA) device management (DM) may be used. OMA DM defines function for device management using a management object (MO). For example, the MO may include a firmware update management object (FUMO) for updating firmware (see OMA-TS-DM-FUMO-V1_0_2), a software component management object (SCOMO) for software management (see OMA-TS-DM-SCOMO-V1_0), a lock and wipe management object for remote locking (see OMA-TS-LAWMO-V1_0), etc. In addition, the MO may include an arbitrary management object which may be defined in OMA DM in the future. The MO may serve as an interface for a specific function between a DM server and a DM client.

When the VM is managed using the MO defined in OMA DM, an existing MO may be advantageously used. That is, for firmware update of a VM, if a FUMO of OMA DM is applied without defining a separate function, existing technology may be reused and thus VM management may be efficient. Hereinafter, a method for performing device management for VM using an MO will be described.

Figure 15:
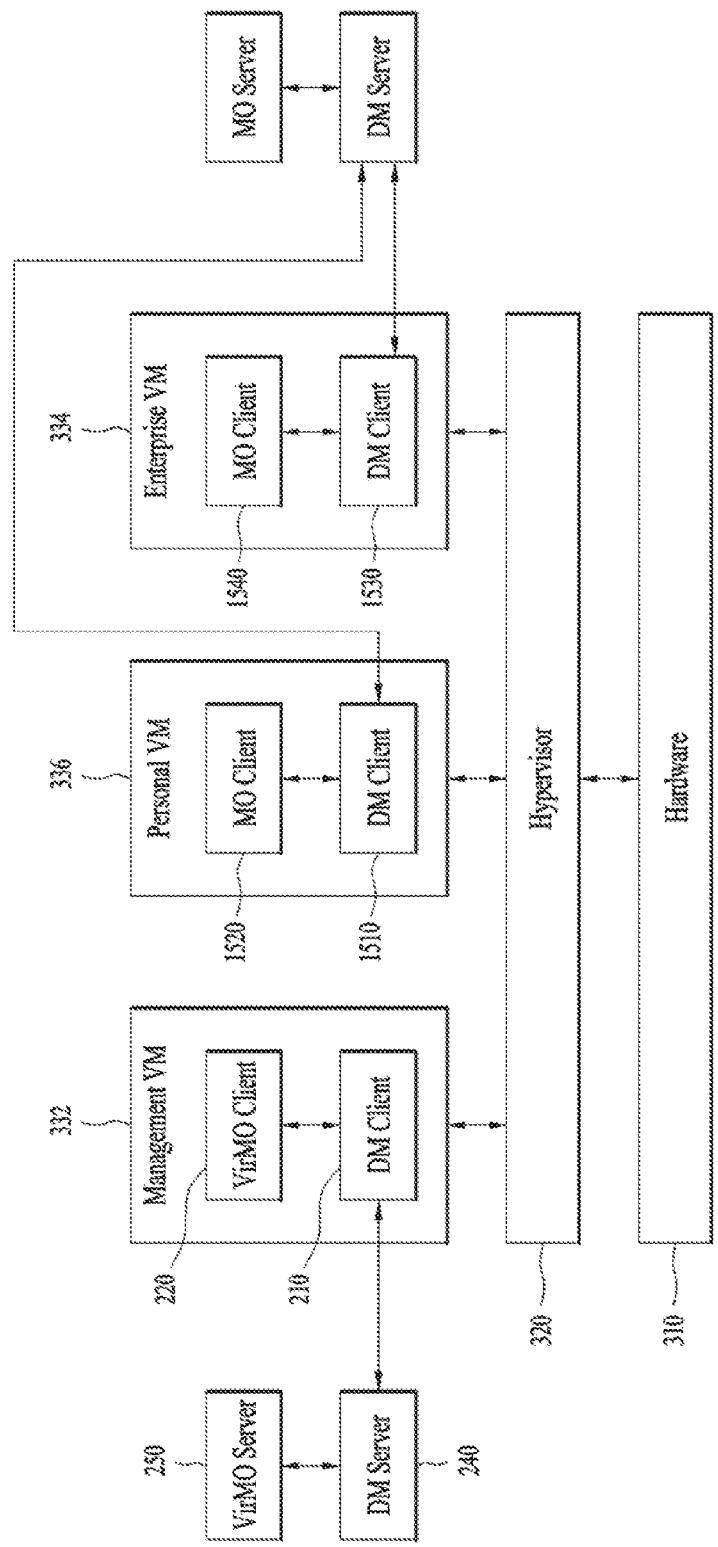
FIGS. 15 and 16 are diagrams showing examples of a method for performing device management using a separate DM client.
Figure 16:
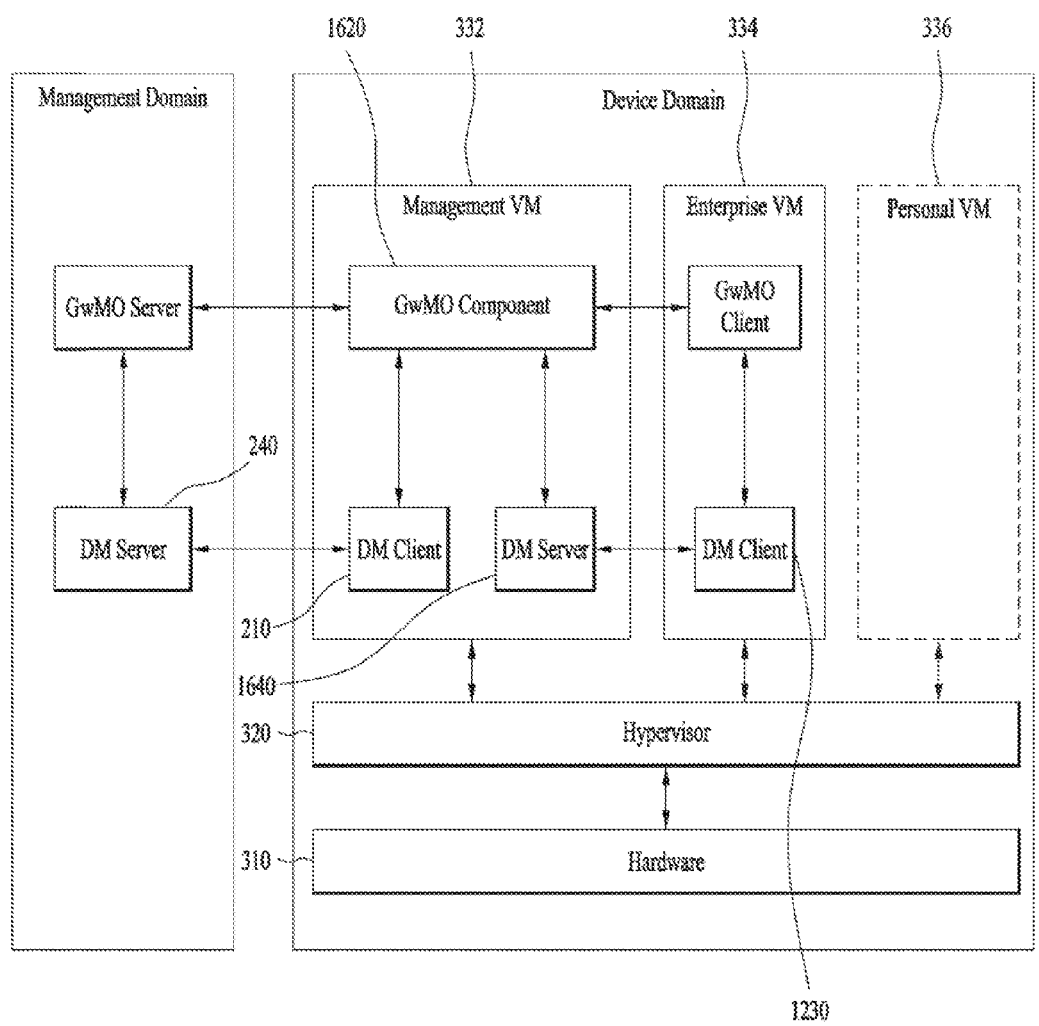

FIGS. 15 and 16 are diagrams showing examples of a method for performing device management using a separate DM client. FIG. 15 shows direct device management for enabling a remote server (e.g., a DM server) to directly communicate with a DM client in a VM to be subjected to device management so as to perform device management and FIG. 16 shows indirect device management for enabling a remote server (e.g., a DM server) to indirectly communicate with a DM client in a VM to be subjected to device management to perform device management.

Referring to FIG. 15, the remote server (e.g., the DM server 240 or the VirMO server 250) may create a personal VM 336 and an enterprise VM 334, for example, and provide device management to the created VMs. In case of direct device management, the DM client 210 needs to be installed in each VM (e.g., the personal VM 336 and the enterprise VM 334) and the DM server 240 may directly communicate with each DM client 1510 or 1530 of each VM. From the viewpoint of the DM server 240, each VM in the device may appear to be a separate device. In some embodiments, since device management does not need to be provided to the personal VM 336, the DM client 1510 may not be installed in the personal VM 336. In addition, although device management is shown as being performed based on Type 1 virtualization in FIG. 15, direct device management may be provided based on Type II virtualization in some embodiments.

In case of direct device management shown in FIG. 15, the DM client in the VM should be bootstrapped in order to directly communicate with the DM server. In addition, since a new DM client is created per VM requiring device management for VM, a new device identifier (ID) should be allocated to the VM. The device ID is determined by unique information of the terminal (e.g., international mobile station identity (IMSI), international mobile equipment identity (IMEI), mobile station international ISDN number (MSISDN), etc.). However, conventionally, since the DM client is manually bootstrapped in a factory (that is, factory bootstrap), it may difficult to bootstrap the dynamically created DM client as in the method of FIG. 15. That is, in FIG. 15, the management VM 332 may be generally regarded as a VM bootstrapped in a terminal (or a device) and the enterprise VM 334 and the personal VM 336 may be regarded as being dynamically created by the server. If the management function is provided to the dynamically created VM, the DM client 1530 for the enterprise VM 334 and the DM client 1510 for the personal VM 336 should be bootstrapped. However, when the DM client for the dynamically created VM is bootstrapped, a device ID and a new key should be allocated.

Referring to FIG. 16, the DM server 240 provides device management to the enterprise VM 334 but the DM client 1230 of the enterprise VM 334 cannot directly communicate with the DM server 240. In this case, the DM server 240 may provide device management using a gateway management object (MO).

In order to provide indirect device management for VM, a transparent mode and a proxy mode may be used. In the transparent mode, DM notification may be delivered to the DM client 1230 of the VM by aid of the gateway MO component 1620 in the device. After receiving DM notification, the DM client 1230 may start a DM session with the DM server 240 and device management for VM may be performed between the DM server 240 and the DM client 1230. Even in the transparent mode, the DM client 1230 of the VM should be bootstrapped in order to communicate with the DM server 240.

In the proxy mode, two DM sessions may be established. One session may be established between the DM server 240 and the DM gateway (operating as the DM client 210) and the other session may be established between the DM gateway (operating as the DM server 1640) and the DM client 1230. Since the DM client 1230 of the VM does not directly communicate with the DM server 240, the DM client 1230 may have a locally unique device ID in the device. In the proxy mode, the DM client 1230 of the VM should be bootstrapped in order to communicate with the DM gateway in the device.

Figure 17:
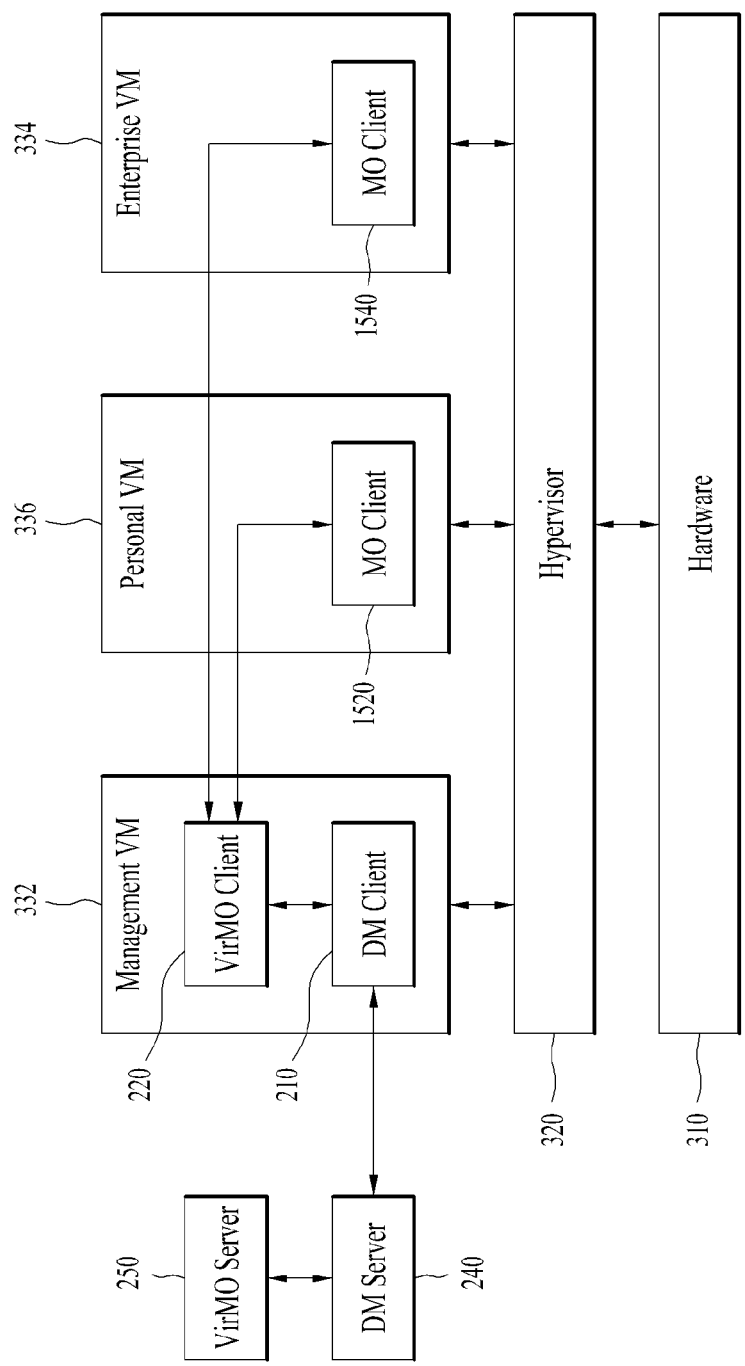
FIG. 17 is a diagram showing an example of a method for performing device management using a shared DM client.

FIG. 17 is a diagram showing an example of a method for performing device management using a shared DM client. The method can manage a plurality of VMs using one DM client present in the terminal without creating each DM client in each VM requiring device management for VM.

Referring to FIG. 17, since the management VM 332 may be regarded as a device (or a terminal), the DM client 210 is present in the device. The personal VM 336 and the enterprise VM 334 are dynamically created by the VirMO server 250 and a separate DM client (e.g., the DM client 1510 or the DM client 1530) is not required in order to provide the management function to these VMs. That is, a plurality of VMs is managed using one DM client 210 located in the management VM 332.

For example, when the VirMO server 250 needs to provide device management for the enterprise VM 334, the DM client 210 of the management VM 332 may be used. The VirMO client 220 may forward a device management command from the VirMO server 250 to other VMs. The remote server recognizes that only one device (e.g., the management VM 332) is present.

More specifically, for example, the dynamically created VMs (the enterprise VM 334 and the personal VM 336) may have the MO client 1540 and the MO client 1520, respectively, when the VirMO server 250 delivers a VM management command to the VirMO client 220, the command is sent to the MO client (e.g., the MO client 1540 or the MO client 1520) located in the VM to perform management for VM. In FIG. 17, one DM client 210 may be present in a terminal. In contrast, in FIG. 17, the MO client is shown as being present per VM. However, this is merely exemplary and the MO client may be present in each VM requiring device management for VM or only one MO client may be present in a device (or a terminal). In addition, although the method of FIG. 17 is shown based on Type 1 virtualization, the method of FIG. 17 is applicable to a device based on Type II virtualization.

For device management via OMA DM, the terminal needs to store a DM tree. The DM tree may include MOs supported by the terminal and the DM server may deliver a management command to the DM client via the DM tree. Similarly, in FIG. 17, in order to forward the device management command to other VMs, the VirMO client needs to have the DM tree for other VMs.

Figure 18:
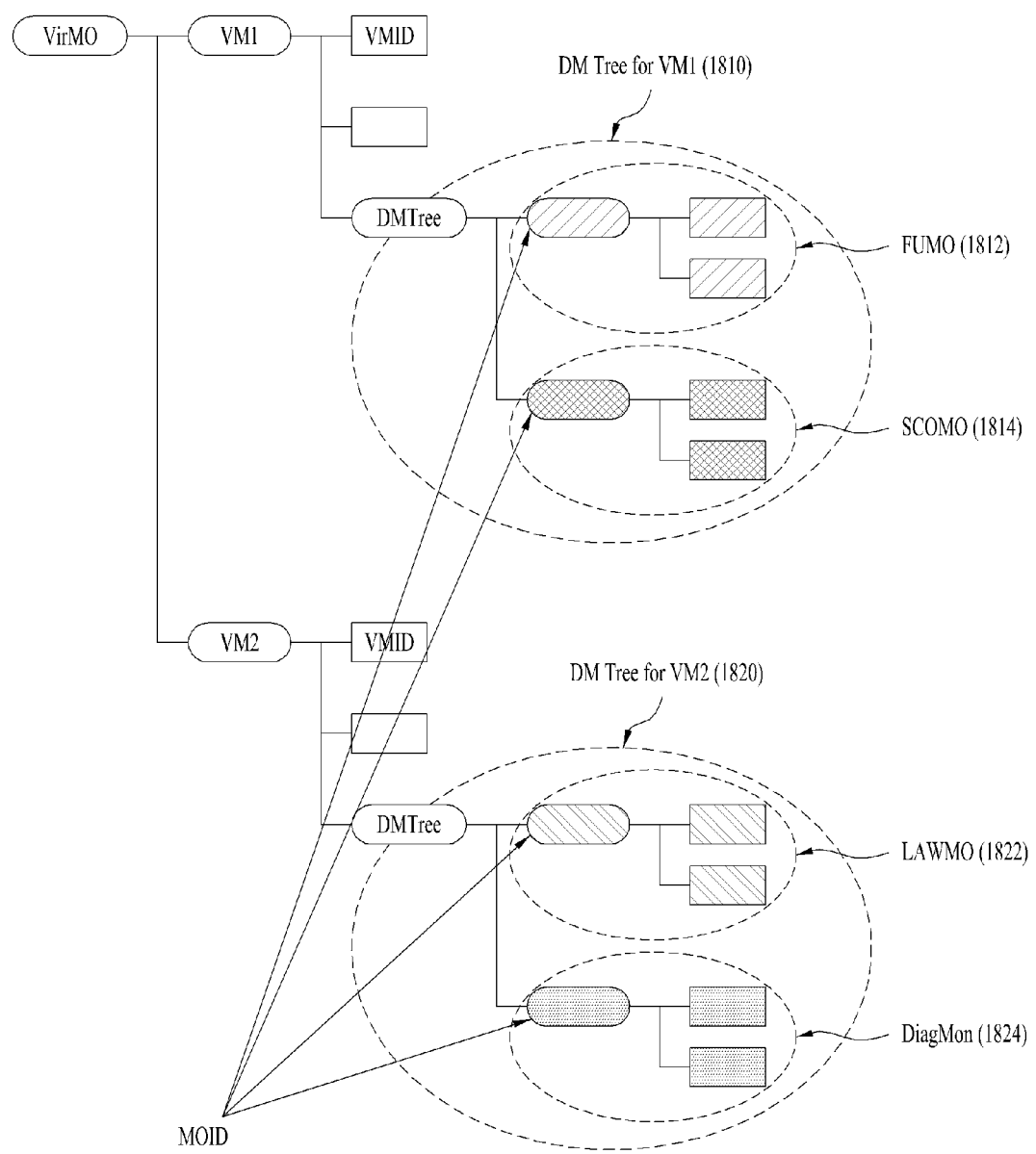
FIG. 18 is a diagram showing a method for configuring a DM tree for each VM, for device management for virtual machine.

FIG. 18 is a diagram showing a method for configuring a DM tree for each VM, for device management for virtual machine.

Referring to FIG. 18, the DM trees for the dynamically crated VMs (e.g., VM1 and VM2) may be configured at a specific location under a virtualization management object (e.g., a VirMO node). The specific location may be a node for configuring information necessary for device management for VM under a node for each VM. The DM tree for each VM may be located under the VirMO/<x>DMTree node, for example. The VirMO server selects a MO to be provided to the VM, creates the MO under the VirMO/<x>/DMTree node and delivers a management command.

In the example of FIG. 18, assume that the VirMO server creates two VMs, that is, VM1 and VM2. If the DM server provides device management for VM1, a DM tree 1810 for VM1 may be created under the VirMO/VM1/DMTree node. All management objects necessary to provide device management for VM may be created under the VirMO/VM1/DMTree node. In the example of FIG. 18, a FUMO sub-tree 1812 and a SCOMO sub-tree 1814 are created. Similarly, if the DM server provides device management for VM2, the DM tree 1820 for VM2 may be created under the VirMO/VM2/DMTree node. All management objects necessary to provide device management for VM may be created under the VirMO/VM2/DMTree node. In the example of FIG. 18, a LAWMO sub-tree 1822 and a DiagMon sub-tree 1824 are created. If the DM server does not provide device management for VM2, the VirMO/VM2/DMTree node may not be created. That is, the DM server may generate the VirMO/<x>/DMTree node with respect to the VM requiring device management for VM.

The VirMO server may deliver a management command to a virtual machine using a DM tree for each VM. For example, in order to update firmware of VM1, the VirMO server may deliver an execution command (e.g., Exec command) to the VirMO/VM1/DMTree/FUMO/Update node. The VirMO client, which has received this command, may interpret the execution command (e.g., Exec command) as a command for VM1 via VirMO/VM1/VMID and thus update the firmware of VM1. If the name of the VirMO/<x> node is identical to VirMO/<x>/VMID, a target VM can be confirmed via the name of the VirMO/<x> node. As a similar example, when VM2 is locked via remote control, the VirMO server may deliver an execution command (e.g., Exec command) to VirMO/VM2/DMTree/LAWMO/Operations/FullyLock. In the above example, VM1 is an enterprise VM and VM2 may be a personal VM.

In addition to the DM trees shown in FIG. 18, DM trees for other MOs may be created. The other MOs may include an arbitrary management object which may be defined in OMA DM in the future.

Figure 19:
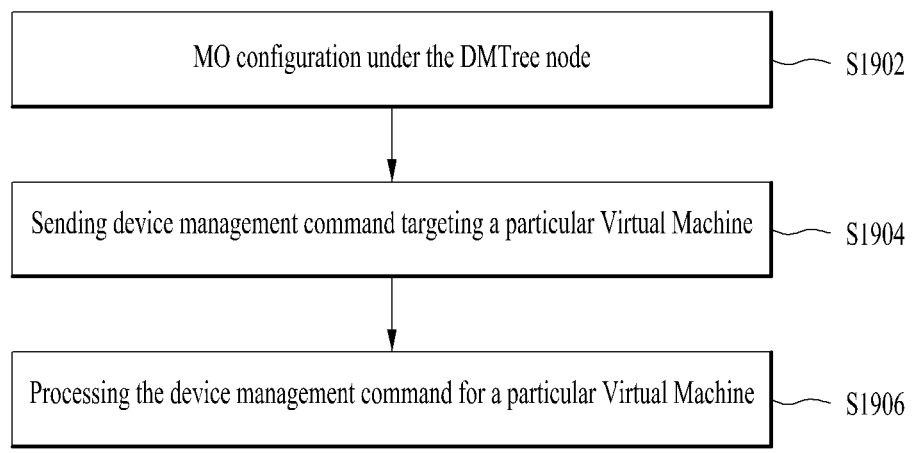
FIG. 19 is a flowchart illustrating a procedure of performing device management for virtual machine.

FIG. 19 is a flowchart illustrating a procedure of performing device management for virtual machine. The server (e.g., the VirMO serve) and the client (e.g., the VirMO client) may send and process a device management command for VM via the following procedure.

Referring to FIG. 19, in step S1902, the server (e.g., the VirMO server) selects and configures a management object (MO), to which a management function will be provided, under a node (e.g., the VirMO/<x>/DMTree node) for device management of a VM sub-tree, after creating a virtual machine. This MO is used to provide device management to the created VM. The VirMO/<x>/DMtree node may serve as a root node for the DM tree belonging to a specific VM. The MO root node may be located under the VirMO/<x>/DMTree node and the MO root node may have a management object ID (e.g., MOID) used to distinguish the type of each MO. For example, if the MO such as Devinfo is configured under the VirMO/<x>/DMTree node, DevID information may use a VM identifier (VMID) stored in a node for device management.

In step S1904, the VirMO server may deliver a management command for VM using the MO when the MO is configured under the VirMO/<x>/DMTree node of a specific VM. The VirMO server may deliver, to a client (e.g., the VirMO client), a management command for VM targeted at the MO located under the VirMO/<x>/DMTree node of the VM, to which the management command will be delivered. For example, if the SCOMO is configured for the enterprise VM, the VirMO server may send a GET command targeted at the VirMO/EnterpriseVM/DMTree/SCOMO/Inventory/Deployed node in order to retrieve software components installed in the enterprise VM.

In step S1906, the VirMO client may check whether the management command (e.g., the DM command) is a device management command for a specific VM, when receiving the management command (e.g., the DM command) for VM from the VirMO server. For example, the VirMO client may determine at which VM the management command is targeted based on a node (e.g., URI of a node) at which the management command (DM command) for VM is targeted. This is because the MO for device management for MO is located under a specific node (e.g., the VirMO/<x>/DMTree node). For example, when the management command (e.g., the DM command) is targeted at the node located under the VirMO/<x>/DMTree, the VirMO client identify the virtual machine by the VirMO/<x>/VMID node and regard the management command as the device management command for the identified virtual machine.

For example, when the management command (e.g., the DM command) is targeted at the VirMO/VM1/DMTree/FUMO/Update node, the VirMO client can recognize that the management command is a firmware update command targeted at VM1 based on the VirMO/VM1/VMID node. As another example, if the management command (e.g., the DM command) is targeted at the VirMO/VM1/DMTree/SCOMO/Inventory/Deployed node, the client (e.g., the VirMO client) can recognize that the management command is used to retrieve software components installed in VM1 identified by the node (e.g., the VirMO/VM1/VMID node) for the VM ID.

The client (e.g., the VirMO client) may respond to the server (e.g., the VirMO server) using a synchronous reporting mechanism or an asynchronous reporting mechanism, after processing for device management command for a specific VM.

Figure 20:
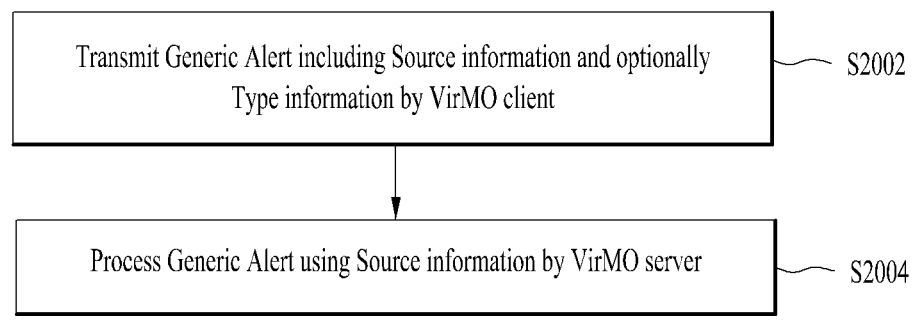
FIG. 20 is a flowchart illustrating a procedure of sending a generic alert created in a VM to a VirMO server and processing the generic alert.

FIG. 20 is a flowchart illustrating a procedure of sending a generic alert generated in a VM to a server (e.g., a VirMO server) and processing the generic alert. The client (e.g., the VirMO client) may transmit the generic alert generated in the VM to the server according to the following procedure and the server may process the generic alert received from the client.

Referring to FIG. 20, in step S2002, the VirMO client may specify and transmit source information to the server (e.g., the VirMO server) when the generic alert is generated in a MO for device management for VM. It is necessary to specify the source information in order to enable the server to identify the VM for generating the generic alert. When the server receives the generic alert, the server may determine in which VM the generic alert is generated using the source information.

For example, FIG. 21 shows an example of a generic alert including source information. In the example of FIG. 21, the server (e.g., the VirMO server) may determine that the generic alert is generated in a specific VM (e.g., VM1) using the source information. The generic alert of FIG. 21 requests firmware update targeted at the specific VM (e.g., VM1) from the server, the server may perform a firmware update management operation targeted at the specific VM (e.g., VM1).

If the source information is not included, a generic alert receiver (e.g., the VirMO server) may determine that the alert is not generated in the specific VM but is generated in the terminal. Even when the source information is included, the generic alert receiver may not know that the alert is directed to the specific VM from the source information since the generic alert receiver does not have a VM management function. In this case, the client (e.g., the VirMO client) may modify type information (e.g., Type). For example, a specific postfix such as "-vm" may be added to generic alert type information (e.g., Generic Alert Type) generated in the VM. In this case, the generic alert receiver, which does not understand the type information (e.g., Type), may transmit an error code (e.g., 415 "Unsupported media Type for Format). FIG. 22 illustrates an example of attaching a postfix "-vm" to Type in an example of the generic alert of FIG. 21.

In step S2004, the server (e.g., the VirMO server) may process the generic alert using the type and source information included in the received generic alert. For example, in an MO for a specific VM located under the node for device management for VM (e.g., the VirMO/<x>/DMTree node), a generic alert may be generated. The alert generated in the MO of the VM may include type information (Type) and the source information (Source) as the generic alert. The type information specifies the type of the generic alert and, for example, an "org.openmobilealliance.dm.firwareupdate.devicerequest" type is a generic alert indicating that a device requests firmware update from a server. The source information specifies address information related to the MO in which the generic alert is generated. Based on this source information, the VirMO server can know in which VM the generic alert is generated. For example, if the type of the generic alert received by the VirMO server is "org.openmobilealliance.dm.firwareupdate.devicerequest" and the source information is "./VirMO/VM1/MO/FUMO", the VirMO server confirm that the generic alert is generated in VM1. Accordingly, the VirMO server may know whether firmware update for VM1 is necessary. If a special indicator such as "-vm" is included, the server (e.g., the VirMO server) may delete this indicator to identify an original generic alert type.

Embodiment of Processing User Interaction Alert

As described with reference to FIG. 17, if the DM client is not installed per VM for device management for VM and the MO for VM is located under a node for device management for VM (e.g., VirMO/<x>/DMTree node), a problem may occur in processing of a user interaction (UI) alert. The UI alert of the DM protocol is defined for user interaction such as user input. For example, UI information may be used to display a message "management in progress" to a user for at least 10 seconds. This UI alert may be delivered to the DM client.

FIG. 23 is a diagram showing a UI alert. In the example of FIG. 23, a numeral (e.g., 1100) included in a data element (e.g., <Data> element) indicates that this alert is a UI display alert, a first <Item><Data> element indicates supplementary information (e.g., minimum display time) and a second <Item><Data> element indicates information to be displayed (e.g., display text).

When a UI alert targeted at a specific VM is transmitted using an existing DM protocol, the DM client may recognize that the UI alert is targeted at the terminal, because the UI information of the existing DM protocol does not include information related to the VM. Accordingly, the present invention proposes a method for configuring UI information for device management for VM.

Figure 24:
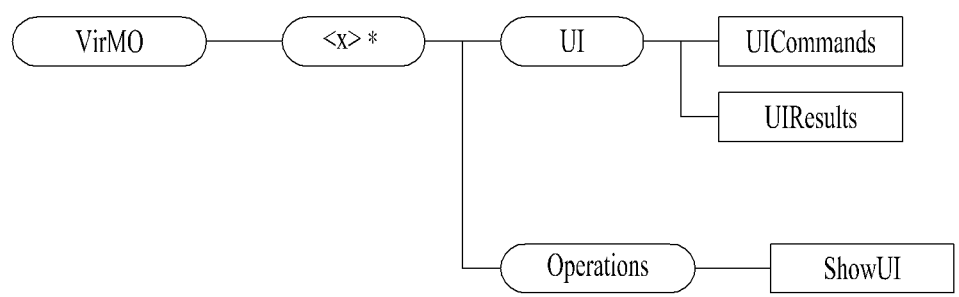
FIG. 24 is a diagram showing an embodiment for implementing a UI alert targeted at a VM.

FIG. 24 is a diagram showing an embodiment for implementing a UI alert targeted at a specific VM.

Referring to FIG. 24, for the UI alert targeted at the specific VM, a node for configuring UI information (e.g., VirMO/<x>/UI node) and a node for receiving a UI command (e.g., ShowUI node) are added. In FIG. 24, the node for configuring UI information (e.g., VirMO/<x>/UI node) is a sub-tree for storing command information (e.g., UICommands node) and an execution result (e.g., UIResults node) related to the UI information. The VirMO/<x>/Operations node which is the node related to the virtualization management object operation is a parent node for operations supported by the virtualization management object as described with reference to FIG. 8.

For example, the VirMO/<x>/Operations/ShowUI node may used as an execution command (e.g., Exec command) for executing a UI command transmitted by the VirMO server through the UI alert. The VirMO server may first configure a command related to UI alert in the VirMO/<x>UFUICommands node and transmit the execution command to the VirMO/<x>/Operations/ShowUI node. The VirMO client executes the UI command of the VirMO/<x>/UFUICommands node and stores the result in the VirMO/<x>/UI/UIResults node, upon receiving the execution command from the node.

Figure 25:
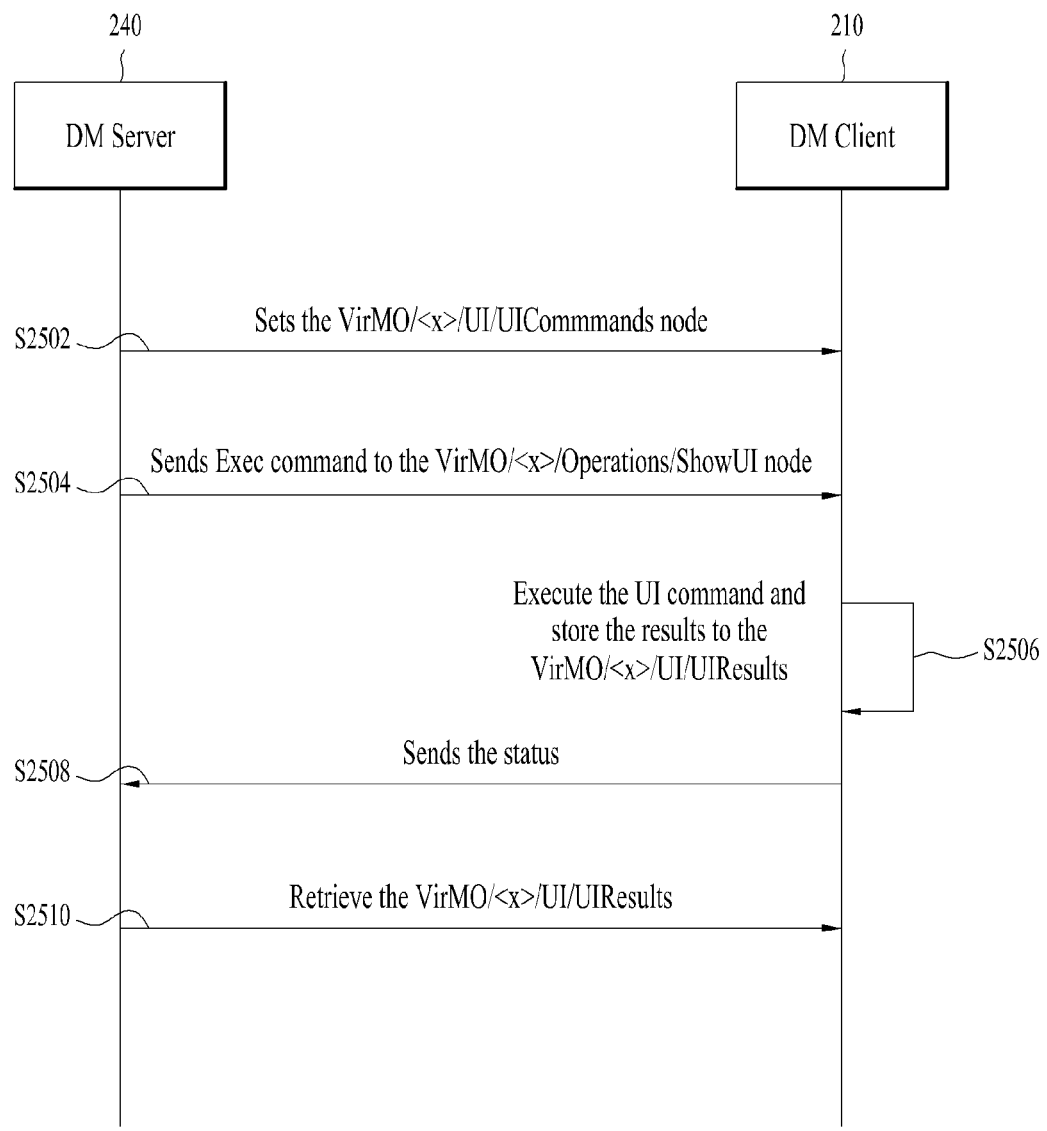
FIG. 25 is a diagram showing a procedure of performing user interaction for a VM.

FIG. 25 is a diagram showing a procedure of performing user interaction for a VM.

Referring to FIG. 25, in step S2502, the server (e.g., the VirMO server) configures UI alert command information in the node for configuring UI command information (e.g., VirMO/<x>/UFUICommands node). For example, the UI alert command information may be expressed by the <Alert> element and the <Alert><data> element may include UI alert code information. For example, the UI alert code which may be defined in DM standard 1.3 may include 1100 (display), 1101 (confirm or reject), 1102 (text input), 1103 (single choice) and 1104 (multiple choice).

In step S2504, the VirMO server may configure UI alert command information in the node for configuring the UI command information (e.g., the VirMO/<x>/UFUICommands node) and then send an execution command (e.g., Exec command) to the node for receiving the UI command (e.g., the VirMO/<x>/Operations/ShowUI node).

In step S2506, the client (e.g., the VirMO client) may perform the UI alert command stored in the VirMO/<x>/UFUICommands node, when receiving the execution command (e.g., the Exec command) from the node for receiving the UI command (e.g., the VirMO/<x>/Operations/ShowUI node). The VirMO client may store <Status> element indicating the result in the VirMO/<x>/UI/UIResults node. For example, in step S2502, the VirMO server may configure the UI alert shown in FIG. 26(*a*) in the VirMO/<x>/UFUICommands node. When the user selects Reject, information input by the user may be included in the <Status><Data> element and stored in the VirMO/<x>/UI/UIResults node as shown in FIG. 26(*b*).

In step S2508, when the command configured in the VirMO/<x>/UFUICommands node has been processed by the VirMO server and the result is stored in the VirMO/<x>/UI/UIResults node, the VirMO client informs the VirMO server that the execution command has been performed.

In step S2510, the VirMO server may receive the status code information indicating that the execution command has been performed and then get the result information stored in the VirMO/<x>/UI/UIResults node.

Although the synchronous reporting mechanism is used in steps S2508 and S2510, an asynchronous reporting mechanism may also be used. If the asynchronous reporting mechanism is used, for example, in step S2508, (202) Accepted for processing status code indicating that the execution command (e.g., Exec command) is being processed may be sent. In addition, for example, if the execution command processing has been finished, the VirMO client transmits the generic alert to the VirMO server to inform that the execution command processing has been finished. After the generic alert is received, the VirMO server may get the result information stored in the VirMO/<x>UI/UIResults.

Figure 27:
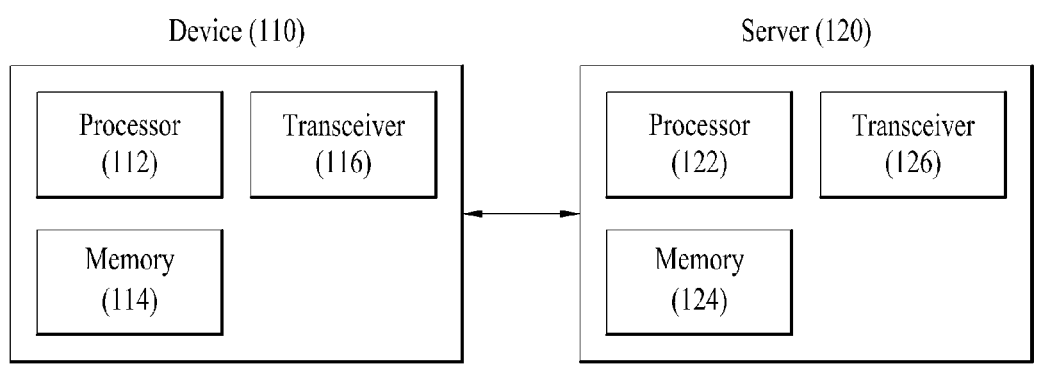
FIG. 27 is a diagram showing a device and server, to which the present invention is applicable.

FIG. 27 is a diagram showing a device and server, to which the present invention is applicable.

As shown in FIG. 27, the device 110, to which the present invention is applicable, includes a processor 112, a memory 114 and a transceiver module 116. The server, to which the present invention is applicable, includes a processor 122, a memory 124 and a transceiver module 126.

The memories 114 and 124 may be respectively connected to the processors 112 and 122 to store a variety of information related to operation of the processor 112 as well as software programs or commands for performing the methods shown in FIGS. 5 to 8.

The processors 112 and 122 are connected to the memories 112 and 122 and the transceiver modules 116 and 126 to control the memories and the transceiver modules, respectively. More specifically, the processors 112 and 212 execute software programs or commands stored in the memories 112 and 122 to execute the methods. The processors 112 and 212 transmit and/or receive the above-described signals via the transceiver modules 116 and 126.

The above-described embodiments and modifications can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit is located inside or outside of the processor, so that it can communicate with the aforementioned processor via a variety of well-known parts.

For example, the method according to the present invention may be stored in a computer-readable recording medium (e.g., an internal memory, a flash memory, a hard disk, etc.) and may be implemented by codes or commands in a software module (or program) executed by a processor (e.g., a microprocessor).

The software module for implementing the embodiments of the present invention may include scripts, batch files, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling submodules may be decomposed so that each sub-module performs its function and passes control directly to another sub-module.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

The present invention may be used for a device such as a terminal and a server.

The invention claimed is:

1. A method for performing device management for a virtual machine at a terminal including a management virtual machine, the method comprising:
creating on the terminal a plurality of virtual machines including the management virtual machine;
configuring a virtualization management object (VirMO) on the management virtual machine, wherein the VirMO includes:
a first node, for each of the plurality of virtual machines, for configuring information related to the respective virtual machine;
a second node for configuring information necessary for device management for the respective virtual machine; and
at least one management object configured under the second node to provide device management for the respective virtual machine;
receiving a device management command from a server through a VirMO client of the management virtual machine included in the terminal;
checking, by the VirMO client of the management virtual machine, whether or not the device management command is for any one of the plurality of virtual machines in view of each of the first nodes; and
processing, by the VirMO client, the device management command when the device management command is for any-one of the plurality of virtual machines, wherein the processing is performed using the at least one management object.

2. The method according to claim 1, wherein the VirMO further includes a node for configuring identification information of the respective virtual machine under the first node and the checking includes determining that the device management command is for the respective virtual machine identified by the identification information if the device management command is targeted at a node located under the second node.

3. The method according to claim 1, wherein:
the at least one management object has a root node configured under the second node and the root node includes a management object identification information, and
the at least one management object is identified by the management object identification information.

4. The method according to claim 1, wherein the VirMO is included in a device management tree of the terminal.

5. The method according to claim 2, wherein the identification information of the respective virtual machine is provided by the terminal and uniquely indicates any one of the plurality of virtual machines within the VirMO.

6. The method according to claim 1, wherein:
the VirMO further includes a third node for configuring information on user interaction and a fourth node for receiving a user interaction command under the first node,
the receiving the device management command includes receiving an execution command via the fourth node, and
the processing the device management command includes executing command information of the user interaction configured in the third node.

* * * * *